United States Patent
Motoyoshi et al.

(10) Patent No.: US 9,555,549 B2
(45) Date of Patent: Jan. 31, 2017

(54) CONTROL DEVICE, ROBOT, ROBOT SYSTEM, AND CONTROL METHOD

(71) Applicant: Seiko Epson Corporation, Tokyo (JP)

(72) Inventors: Masaki Motoyoshi, Shiojiri (JP); Kenji Onda, Matsumoto (JP); Hiroyuki Kawada, Suwa (JP); Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/520,672

(22) Filed: Oct. 22, 2014

(65) Prior Publication Data

US 2015/0120047 A1    Apr. 30, 2015

(30) Foreign Application Priority Data

Oct. 31, 2013    (JP) .................. 2013-227274
Oct. 31, 2013    (JP) .................. 2013-227275

(51) Int. Cl.
B25J 9/16    (2006.01)

(52) U.S. Cl.
CPC .......... B25J 9/1697 (2013.01); B25J 9/1687 (2013.01); *G05B 2219/40031* (2013.01); *Y10S 901/30* (2013.01); *Y10S 901/47* (2013.01)

(58) Field of Classification Search
CPC ...... B25J 9/1697; B25J 9/1687; Y10S 901/47; Y10S 901/30; G05B 2219/40031
See application file for complete search history.

(56) References Cited

U.S. PATENT DOCUMENTS

| | | | |
|---|---|---|---|
| 4,598,456 A | 7/1986 | McConnell | |
| 4,738,025 A * | 4/1988 | Arnold | H05K 13/08 29/740 |
| 4,909,376 A * | 3/1990 | Herndon | B25J 9/1697 198/395 |
| 4,980,971 A * | 1/1991 | Bartschat | H01L 21/681 29/720 |
| 5,467,517 A | 11/1995 | Sugito et al. | |
| 5,521,843 A * | 5/1996 | Hashima | B25J 9/1697 340/815.54 |
| 6,167,607 B1 * | 1/2001 | Pryor | A01B 69/008 29/407.04 |
| 6,304,050 B1 * | 10/2001 | Skaar | B25J 9/1692 318/568.11 |
| 6,763,283 B1 * | 7/2004 | Murakami | B25J 9/1697 348/113 |

(Continued)

FOREIGN PATENT DOCUMENTS

| | | |
|---|---|---|
| CN | 101178599 A | 5/2008 |
| CN | 103313591 A | 9/2013 |

(Continued)

*Primary Examiner* — Nicholas Kiswanto
(74) *Attorney, Agent, or Firm* — Harness, Dickey & Pierce, P.L.C.

(57) ABSTRACT

A control device includes a reception unit that receives first operation information and second operation information different from the first operation information; and a process unit that instructs a robot to execute operations based on the first operation information and the second operation information using a plurality of captured images of an imaged target object, the images being captured multiple times while the robot moves from a first posture to a second posture different from the first posture.

6 Claims, 17 Drawing Sheets

(56) References Cited

U.S. PATENT DOCUMENTS

| | | | |
|---|---|---|---|
| 6,816,755 B2 * | 11/2004 | Habibi et al. | B25J 9/1697 318/568.11 |
| 8,774,967 B2 | 7/2014 | Ooga | |
| 9,188,973 B2 * | 11/2015 | Tenney | G06T 7/002 |
| 2003/0198376 A1 * | 10/2003 | Sadighi | B25J 9/1697 382/153 |
| 2006/0074526 A1 * | 4/2006 | Watanabe | B25J 9/1671 700/245 |
| 2012/0072021 A1 * | 3/2012 | Walser | B25J 9/1697 700/254 |
| 2013/0245828 A1 * | 9/2013 | Tateno | B25J 9/1697 700/259 |

FOREIGN PATENT DOCUMENTS

| | | |
|---|---|---|
| JP | 06-079546 | 3/1994 |
| JP | 2012-130977 A | 7/2012 |
| JP | 2013-154446 A | 8/2013 |
| JP | 2013-154449 A | 8/2013 |

* cited by examiner

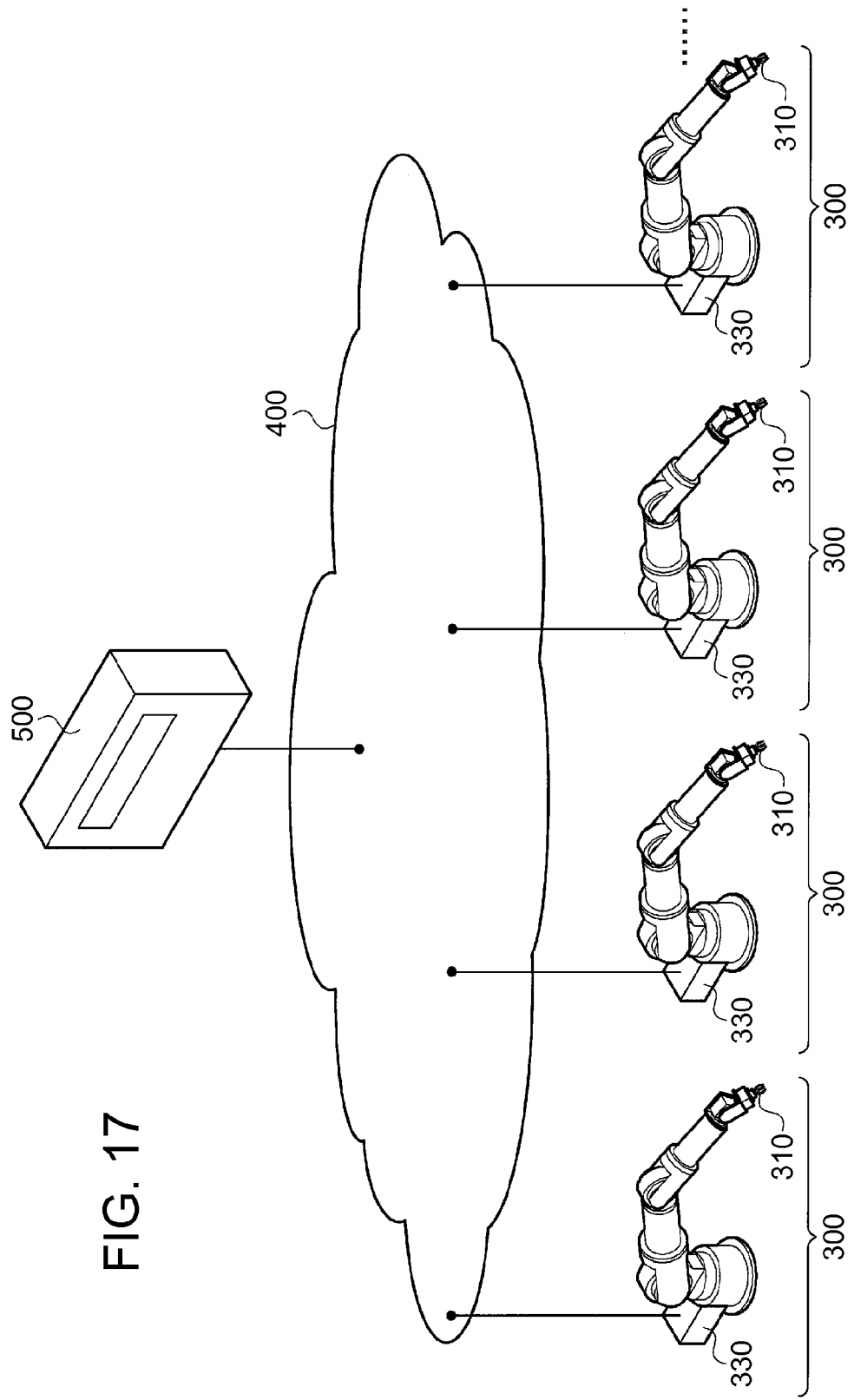

CONTROL DEVICE, ROBOT, ROBOT SYSTEM, AND CONTROL METHOD

BACKGROUND

1. Technical Field

The present invention relates to a control device, a robot, a robot system, and a control method.

2. Related Art

Attention is paid to an assembly robot as production equipment that can handle small volumes of production in great varieties. For example, the assembly robot may execute an operation of inserting a part with a plurality of legs, for example, a capacitor, into an electronic substrate. It is necessary to determine a procedure in which the legs are inserted into the electronic substrate, when executing the insertion operation of the part with a plurality of legs.

JP-A-2013-154446 discloses a method of determining a procedure in which the plurality of legs are inserted into the electronic substrate, for example, a method of acquiring data of allowable deformation amount regarding each fitting leg of a first workpiece, and inserting the fitting leg of the first workpiece into a fitting hole of a second workpiece based on the data of allowable deformation amount.

However, JP-A-2013-154446 does not disclose a method of moving the workpieces to respective assembly positions. Since it is necessary to bring the fitting leg close to the fitting hole so as to insert the fitting leg into the fitting hole, it is necessary to determine how to move the workpieces to an insertion position.

For example, when the second workpiece is not accurately disposed at a determined position, and only the first workpiece is moved to a determined position, the workpieces cannot be placed at the insertion position. Alternatively, when the insertion legs have different lengths like the capacitor, it is necessary to determine a positional relationship between the legs of different lengths and two holes via the movement of the capacitor.

SUMMARY

A first aspect of the invention relates to a control device including a reception unit that receives first operation information and second operation information different from the first operation information; and a process unit that instructs a robot to execute operations based on the first operation information and the second operation information using a plurality of captured images of an imaged target object, the images being captured multiple times while the robot moves from a first posture to a second posture different from the first posture.

According to the first aspect of the invention, the operation of the robot is controlled using the plurality of images captured while the posture of the robot is changed. At this time, the first operation information and the second operation information different from the first operation information are received, and the operation of the robot is controlled based on the first operation information and the second operation information which are received. Accordingly, it is possible to instruct the robot to execute two different operations when a workpiece is moved to a target position, and it is possible to more reliably move the workpiece to the target position.

In the first aspect of the invention, the first operation information and the second operation information may have different priorities. The second operation information may have a priority lower than that of the first operation information.

Accordingly, when the workpiece is moved to the target position, it is possible to instruct the robot to execute two operations with different priorities. That is, it is possible to appropriately dispose the workpiece with respect to the target position by realizing the operation based on the high-priority first operation information and the operation based on the second operation information as much as possible.

In the first aspect of the invention, the first operation information may be information of an operation of aligning a first portion of a workpiece with a first target. The second operation information may be information of an operation of bringing a second portion close to a second target, the second portion being a portion of the workpiece or a portion of the robot.

Accordingly, it is possible to execute the operation of aligning the first portion of the workpiece with the first target, and in the operation different from the alignment operation, it is possible to bring the second portion close to the second target, the second portion being a portion of the workpiece or a portion of the robot. Accordingly, it is possible to align the first portion with the target, and move the second portion to a more appropriate position.

In the first aspect of the invention, the process unit may instruct the robot to execute operations based on the first operation information and the second operation information by executing a process of aligning a first feature corresponding to the first portion with a first target feature corresponding to the first target, and a process of aligning a second feature corresponding to the second portion with a second target feature corresponding to the second target.

Accordingly, it is possible to instruct the robot to execute the operation based on the first operation information via the process of aligning the first feature with the first target feature, and it is possible to instruct the robot to execute the operation based on the second operation information different from the first operation information via the process of aligning the second feature with the second target feature.

In the first aspect of the invention, the first characteristic and second features may be image features based on the plurality of images. The second portion may be a portion of the workpiece, the portion being different from the first portion. The first target characteristic and second target features may be image features based on reference images.

Accordingly, it is possible to instruct the robot to execute the operation of aligning the first portion of the workpiece with the first target, and the different operation of aligning the second portion of the workpiece with the second target, based on the image features.

In the first aspect of the invention, the first feature may be an image feature based on the plurality of images. The first target feature may be an image feature based on reference images. The second portion may be an end effector of the robot. The second feature may be the posture of the end effector. The second target feature may be the posture of the end effector when the operations are started based on the first operation information and the second operation information.

Accordingly, it is possible to instruct the robot to execute the operation of aligning the first portion of the workpiece with the first target, based on the image feature. In the different operation, it is possible to instruct the robot to execute an operation of bringing the posture of the end effector close to a posture when the operation is started, using the posture of the end effector as a feature.

In the first aspect of the invention, the first feature may be an image feature based on the plurality of images. The first target feature may be an image feature based on the reference images. The second portion may be a portion of the workpiece, the portion being different from the first portion. The second feature may be an estimated change amount that is an estimate of a change amount of the image feature of the second portion, the change amount being caused by the operation based on the first operation information. The second target feature may indicate that the estimated change amount becomes zero.

Accordingly, it is possible to instruct the robot to execute the operation of aligning the first portion of the workpiece with the first target, based on the image feature. In the different operation, it is possible to instruct the robot to execute a low-priority operation of bringing the second portion of the workpiece close to the second target, based on the estimated change amount of the image feature of the second portion.

In the first aspect of the invention, when a display screen for the input of the first operation information and the second operation information is displayed on a display unit, the reception unit may receive the first operation information and the second operation information that a user inputs via the display screen.

Accordingly, the user can input the first operation information and the second operation information via the display screen, and it is possible to instruct the robot to execute a user's two different desired operations based on the input information.

In the first aspect of the invention, the display screen may display an image of a first workpiece and an image of a second workpiece. The first operation information may be information that is input by designating a first portion in the image of the first workpiece, and designating a first target in the image of the second workpiece, the first portion being aligned with the first target. The second operation information may be information input by designating a second portion in the image of the first workpiece, and designating a second target in the image of the second workpiece, the second portion being brought close to the second target.

Accordingly, since it is preferred that the display screen display the workpiece as an image, and a portion or a target is indicated on the image, the portion or the target being operation information, it is possible to provide a user interface which is visually easy to comprehend.

In the first aspect of the invention, the display screen may display a first selection item for the input of the first operation information, and a second selection item for the input of the second operation information. The first operation information and the second operation information may be information that is input when the user selects desired operations from the first selection item and the second selection item, respectively.

Accordingly, the operation is displayed as the selection item, and thus it is possible to instruct operations such as the posture of the end effector or an imaginary movement of the workpiece which cannot be displayed by only the feater points or target points.

In the first aspect of the invention, the process unit may instruct the robot to execute an operation based on the first operation information earlier than an operation based on the low-priority second operation information.

Accordingly, when the process unit executes a task instructed by the first operation information and the second operation information, and the execution of the task causes the robot to operate, it is possible to accomplish the instruction of the high-priority first operation information at a higher rate.

In the first aspect of the invention, the first operation information may be information of an operation that is executed at a degree of freedom lower than a degree of freedom of the position and posture of an end effector of the robot. The second operation information may be information of the operation based on the first operation information, the operation being executed at a redundant degree of freedom of the position and posture of the end effector of the robot.

Accordingly, it is possible to instruct the robot to execute the operation based on the first operation information at a degree of freedom lower than that of the position and posture of the end effector of the robot, and it is possible to instruct the robot to execute the operation based on the second operation information at the redundant degree of freedom of the position and posture of the end effector in that operation.

In the first aspect of the invention, the process unit may instruct the robot to execute the operations based on the first operation information and the second operation information by executing a process of aligning an image feature with a degree of freedom lower than that of the position and posture of an end effector of the robot with a target feature, and a process of maximizing an evaluation function that defines the operation based on the second operation information.

Accordingly, it is possible to instruct the robot to execute the operation based on the first operation information by executing the process of aligning the image feature with a degree of freedom lower than that of the position and posture of the end effector of the robot with the target feature, and it is possible to instruct the robot to execute the operation based on the second operation information by executing the process of maximizing the evaluation function.

In the first aspect of the invention, the process unit may control a change $\Delta X$ of a position and posture $X$ of the end effector using $\Delta X = \lambda J^{\#}(Sg-S)+(I-J^{\#}J)\xi kp$. $S$ may be an image feature based on the plurality of captured images, $Sg$ may be a target feature based on the reference images, $\xi$ may be a differential by $X$ of the evaluation function, $J$ may be Jacobian that relates the $X$ to the $S$, $J^{\#}$ may be a pseudo-inverse matrix of the $J$, $I$ is a unit matrix, and $\lambda$ and $kp$ may be control gains.

Accordingly, it is possible to realize the process of aligning the image feature with a degree of freedom lower than that of the position and posture of the end effector with the target feature, using a first term $\lambda J^{\#}(Sg-S)$, and it is possible to realize the process of maximizing the evaluation function that defines the operation based on the second operation information, using a second term $(I-J^{\#}J)\xi p$.

In the first aspect of the invention, the operations based on the first operation information and the second operation information may include a certain operation. The certain operation may include anyone of an assembly operation, a fitting operation, and an insertion operation.

Accordingly, it is possible to instruct the robot to execute a certain operation such as the assembly operation, the fitting operation, and the insertion operation as the operations based on the first operation information and the second operation information.

In the first aspect of the invention, the process unit may instruct the robot to execute the operations based on the first operation information and the second operation information via a visual servo control using the plurality of captured images.

Accordingly, it is possible to instruct the robot to execute the operations based on the first operation information and the second operation information, using the visual servo control by which the robot is feedback-controlled based on the features extracted from the captured images.

A second aspect of the invention relates to a robot which receives first operation information and second operation information different from the first operation information, and which receives a plurality of captured images of an imaged target object, the images being captured multiple times while the robot moves from a first posture to a second posture different from the first posture, and which executes operations based on the first operation information and the second operation information using the plurality of captured images.

A third aspect of the invention relates to a robot system including a reception unit that receives first operation information and second operation information different from the first operation information; an imaging unit that captures the image of an imaged target object multiple times while a robot moves from a first posture to a second posture different from the first posture; and the robot that executes operations based on the first operation information and the second operation information using a plurality of the images captured by the imaging unit.

A fourth aspect of the invention relates to a control method including receiving first operation information and second operation information different from the first operation information; and instructing a robot to execute operations based on the first operation information and the second operation information using a plurality of captured images of an imaged target object, the images being captured multiple times while the robot moves from a first posture to a second posture different from the first posture.

A fifth aspect of the invention relates to a control device that instructs a robot to assemble a first workpiece including a first main body portion, a first portion, and a second portion and a second workpiece including a first hole portion and a second hole portion. The control device includes a process unit that instructs the robot to execute a first operation of bringing the first portion of the first workpiece close to the first hole portion of the second workpiece, and a second operation of bringing the second portion of the first workpiece close to the second hole portion of the second workpiece, using a plurality of captured images of an imaged target object, the images being captured multiple times while the robot moves from a first posture to a second posture different from the first posture.

According to the fifth aspect of the invention, it is possible to bring the first portion of the first workpiece close to the first hole portion of the second workpiece, and the second portion of the first workpiece close to the second hole portion of the second workpiece, by controlling the robot using the plurality of images captured while the posture of the robot is changed. Accordingly, it is possible to instruct the robot to execute two operations when the workpieces are moved to a target position, and it is possible to more reliably move the workpieces to the target position.

In the fifth aspect of the invention, when the first portion has a length greater than that of the second portion, the robot may execute the first operation earlier than the second operation.

As such, it is possible to assemble the first workpiece and the second workpiece in a procedure appropriate for the shapes of workpieces by executing the first operation earlier than the second operation. That is, when the first workpiece is brought close to the second workpiece, first, it is possible to bring the long portion close to the hole portion, the long portion reaching the hole portion in advance of the short portion, and it is possible to bring the short portion to the hole portion, the short portion reaching the hole portion subsequent to the long portion.

In the fifth aspect of the invention, the robot may deform the first portion, and execute the second operation. Accordingly, it is possible to accurately bring the second portion close to the second hole portion by deforming the pre-inserted first portion in the second operation. Accordingly, in a subsequent operation, it is possible to insert the second portion into the second hole portion via only the movement of the second portion toward an insertion direction.

In the fifth aspect of the invention, the first workpiece may be a capacitor, and the first and second portions may be terminals of the capacitor.

Accordingly, when the capacitor is the first workpiece, it is possible to assemble the capacitor and the second workpiece by inserting the terminals of the capacitor into the first and second hole portions of the second workpiece, respectively.

In the fifth aspect of the invention, the second workpiece may be an electronic substrate, and the first and second hole portions may be holes into which the terminals are mounted.

Accordingly, when the electronic substrate is the second workpiece, it is possible to assemble the capacitor and the electronic substrate by inserting the terminals of the capacitor into the holes of the electronic substrate, respectively.

In the fifth aspect of the invention, the process unit may instruct the robot to execute the insertion operation of the first portion into the first hole portion between the first and second operations.

Accordingly, it is possible to bring the long first portion close to the first hole portion in the first operation, then insert the first portion into the first hole portion, and then bring the short second portion close to the second hole portion. As such, it is possible to instruct the robot to execute the first operation earlier than the second operation.

In the fifth aspect of the invention, the process unit may instruct the robot to execute the second operation, and then may instruct the robot to execute the operation of inserting the second portion into the second hole portion.

Accordingly, it is possible to bring the short second portion close to the second hole portion, and then insert the second portion into the second hole portion.

As such, the first and second portions are respectively inserted into the first hole and second hole portions, and thus it is possible to assemble the first workpiece and the second workpiece.

In the fifth aspect of the invention, the process unit may instruct the robot to execute the first and second operations via visual servo control using the plurality of captured images, and may instruct the robot to execute the operations of inserting the first and second portions into the first hole and second hole portions, respectively, using a position control.

Since the visual servoing controls a relative positional relationship using the images, even though the relative positional relationship between the portion and the hole portion is not the same, it is possible to accurately bring the portion of the workpiece close to the hole portion. Since the insertion direction is determined, it is possible to insert the portion of the workpiece into the hole portion using the position control, after the portion of the workpiece is brought close to the hole portion.

In the fifth aspect of the invention, the process unit may instruct the robot to execute the operation of inserting the first portion into the first hole portion in the second operation, and after the robot executes the second operation, the process unit may instruct the robot to execute the operation of inserting the second portion into the second hole portion.

In a case where the first portion has a length greater than that of the second portion, when executing the second operation of bringing the second portion close to the second hole portion in a state where the first portion is brought close to the first hole portion via the first operation, it is possible to naturally insert the first portion into the first hole portion. For this reason, it is possible to simultaneously execute the insertion operation of the first portion in the second operation, and it is possible to reduce the number of steps of the operation.

In the fifth aspect of the invention, the process unit may instruct the robot to execute the first and second operations via visual servo control using the plurality of captured images, and may instruct the robot to execute the operation of inserting the second portion into the second hole portion using a position control.

Since the visual servoing controls a relative positional relationship using the images, it is possible to accurately bring the portion of the workpiece close to the hole portion. Since the insertion direction is determined, it is possible to insert the second portion into the second hole portion using the position control, after the second portion is brought close to the second hole portion.

In the fifth aspect of the invention, when the first and second portions have the same length, the robot may simultaneously execute the first and second operations.

Accordingly, when the first and second operations are simultaneously executed, it is possible to efficiently proceed with the operation of the workpiece with the first and second portions of the same length. For example, since the first and second portions are respectively brought close to the first hole and second hole portions via one time of the visual servoing, it is possible to reduce the number of steps of the operation and simplify the assembly work.

In the fifth aspect of the invention, the first workpiece may be a resistor element, and the first and second portions may be terminals of the resistor element.

Accordingly, when the resistor element is the first workpiece, it is possible to assemble the resistor element and the second workpiece by inserting the terminals of the resistor element into the first and second hole portions of the second workpiece, respectively.

In the fifth aspect of the invention, the second workpiece may be an electronic substrate, and the first and second hole portions may be holes into which the terminals are mounted.

Accordingly, when the electronic substrate is the second workpiece, it is possible to assemble the resistor element and the electronic substrate by inserting the terminals of the resistor element into the holes of the electronic substrate, respectively.

In the fifth aspect of the invention, the process unit instructs the robot to execute the first and second operations, and then may instruct the robot to execute the operations of inserting the first and second portions into the first hole and second hole portions, respectively.

Accordingly, it is possible to bring the first and second portions of the same length close to the first hole and second hole portions, respectively, and then insert the first and second portions into the first hole and second hole portions, respectively. As such, it is possible to assemble the first workpiece and the second workpiece.

In the fifth aspect of the invention, the process unit may instruct the robot to execute the first and second operations via visual servo control using the plurality of captured images, and may instruct the robot to execute the operations of inserting the first and second portions into the first hole and second hole portions, respectively, using a position control.

Since the visual servoing controls a relative positional relationship using the images, it is possible to accurately bring the portion of the workpiece close to the hole portion. Since the insertion direction is determined, it is possible to insert the portion of the workpiece into the hole portion using the position control, after the first and second portions are respectively brought close to the first hole and second hole portions.

A sixth aspect of the invention relates to a robot that assembles a first workpiece including a first main body portion, a first portion, and a second portion and a second workpiece including a first hole portion and a second hole portion. The robot receives a plurality of captured images of an imaged target object, the images being captured multiple times while the robot moves from a first posture to a second posture different from the first posture, and executes a first operation of bringing the first portion of the first workpiece close to the first hole portion of the second workpiece, and a second operation of bringing the second portion of the first workpiece close to the second hole portion of the second workpiece, using the plurality of captured images.

A seventh aspect of the invention relates to a robot system by which a first workpiece including a first main body portion, a first portion, and a second portion is assembled with a second workpiece including a first hole portion and a second hole portion. The robot system includes an imaging unit that captures the image of an imaged target object multiple times while a robot moves from a first posture to a second posture different from the first posture; and the robot that executes a first operation of bringing the first portion of the first workpiece close to the first hole portion of the second workpiece, and a second operation of bringing the second portion of the first workpiece close to the second hole portion of the second workpiece, using a plurality of the images captured by the imaging unit.

An eighth aspect of the invention relates to a method of controlling a robot to assemble a first workpiece including a first main body portion, a first portion, and a second portion and a second workpiece including a first hole portion and a second hole portion. The control method includes receiving a plurality of captured images of an imaged target object, the images being captured multiple times while the robot moves from a first posture to a second posture different from the first posture; and instructing the robot to execute a first operation of bringing the first portion of the first workpiece close to the first hole portion of the second workpiece, and a second operation of bringing the second portion of the first workpiece close to the second hole portion of the second workpiece, using a plurality of the captured images.

As described above, according to several aspects of the invention, it is possible to provide a control device that can more reliably move the workpieces to the target position, a robot, a robot system, and a control method.

BRIEF DESCRIPTION OF THE DRAWINGS

The invention will be described with reference to the accompanying drawings, wherein like numbers reference like elements.

FIG. 17 illustrates a configuration example of a robot control system by which the robots are controlled via a network.

DESCRIPTION OF EXEMPLARY EMBODIMENTS

Hereinafter, a preferred embodiment of the invention will be described in detail. The aspects of the invention are not unduly limited to the embodiment to be described below, and the entirety of configurations to be described in the embodiment is not always required as solution means of the invention.

1. Control Device

Figure 1A:
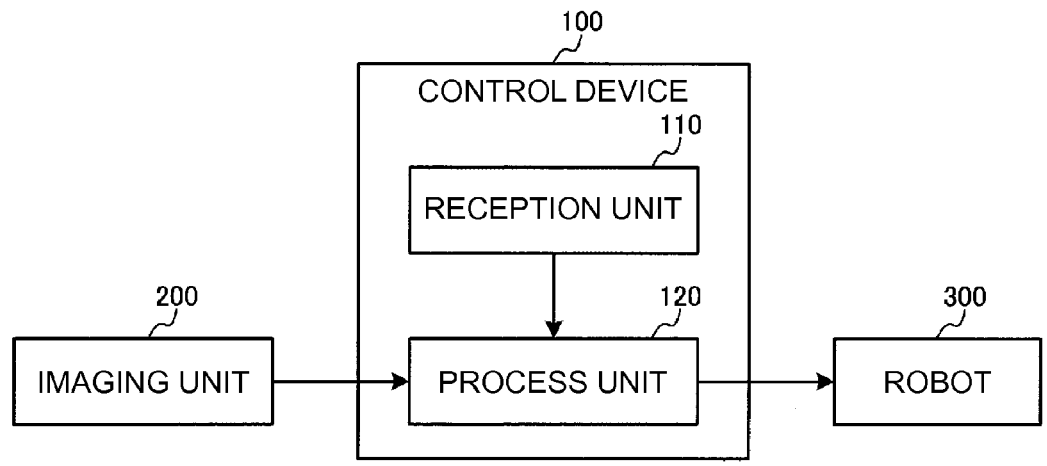
FIG. 1A illustrates a first configuration example and a third configuration example of a control device.

FIG. 1A illustrates a first configuration example of a control device that controls a robot using a control method of the embodiment. The first configuration example of a control device 100 will be described with reference to FIG. 1A. The first configuration example of the control device 100 includes a reception unit 110 and a process unit 120.

The reception unit 110 receives first operation information, and second operation information different from the first operation information. For example, the reception unit 110 receives the first operation information and the second operation information which are input by a user. Alternatively, the control device 100 may include a storage unit (for example, a RAM, a hard disc drive, a ROM) (not illustrated) that stores the first operation information and the second operation information, and the reception unit 110 may receive the information read from the storage unit. At this time, for example, the reception unit 110 is a memory controller.

The process unit 120 executes a process of causing a robot 300 to execute operations based on the first operation information and the second operation information, using a plurality of captured images of an imaged target object, the images being captured multiple times while the robot 300 moves from a first posture to a second posture different from the first posture. Specifically, an imaging unit 200 captures images in time series, and the process unit 120 controls the robot 300 using visual servoing based on the images captured in time series, and instructs the robot 300 to execute operations based on the first operation information and the second operation information. For example, the process unit 120 is configured by a CPU, a GPU, or the like.

Figure 1B:
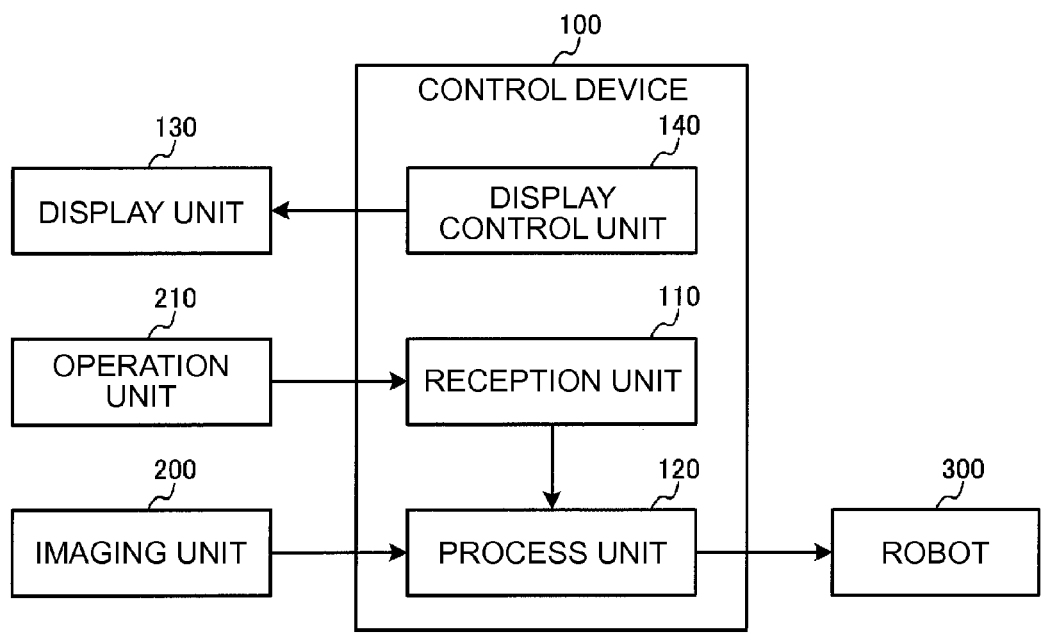
FIG. 1B illustrates a second configuration example of the control device.

FIG. 1B illustrates a second configuration example of the control device, and an example in which operation information input by the user is received. The second configuration example of the control device 100 will be described with reference to FIG. 1B. The second configuration example of the control device 100 includes the reception unit 110, the process unit 120, and a display control unit 140.

The display control unit 140 executes a control to display a display screen for the input of the first operation information and the second operation information on a display unit 130. For example, the display screen will be described later with reference to FIGS. 12 and 13. The user inputs the first operation information and the second operation information via an operation unit 210 while watching the display screen. The reception unit 110 receives the information that is input. For example, the reception unit 110 is an interface that connects the operation unit 210 and the control device 100.

For example, the control device 100 instructs the robot 300 to execute an assembly operation of a capacitor 20 which will be described with reference to FIG. 2. In this operation, first, a long lead wire 30 of the capacitor 20 is inserted into a first hole 60 of an electronic substrate 50 (step S4). At this time, since it is necessary to accurately bring the long lead wire 30 close to the first hole 60 (step S3), the first operation information is instruction information to align the long lead wire 30 with the first hole 60. In the embodiment, since the long lead wire 30 and the first hole 60 are brought close to each other on an image using the visual servoing (in a broad sense, a robot control using a plurality of captured images from the imaging unit), it is possible to align the long lead wire 30 with the first hole 60 even though the electronic substrate 50 is not accurately located at a determined position every time.

However, since the long lead wire 30 is merely aligned with the first hole 60 based on only the first operation information, it is not possible to determine where a short lead wire 40 is positioned with respect to a second hole 70. When the short lead wire 40 takes a free position, an arm of the robot 300 takes an unnatural posture or an impossible posture, or it is difficult to align the short lead wire 40 with the second hole 70 when the short lead wire 40 is inserted into the second hole 70. Accordingly, the reception unit 110 receives instruction information to bring the short lead wire 40 as close to the second hole 70 as possible, as the second operation information different from the first operation information. As a result, it is possible to bring the short lead wire 40 close to the second hole 70 while satisfying a condition that the long lead wire 30 is aligned with the first hole 60, and it is possible to address the problem.

More specifically, the first operation information and the second operation information have different priorities. The second operation information has a priority lower than that of the first operation information. In the example of step S3 in FIG. 2, a high-priority operation is an operation of inserting the long lead wire 30 of the capacitor 20 into the first hole 60 of the electronic substrate 50. A low-priority operation is an operation of bringing the short lead wire 40 as close to the second hole 70 as possible.

As such, the control device 100 can execute a visual servoing control using the information with different priorities so that the robot 300 preferentially accomplishes an instruction indicated by the first operation information with a priority higher than that of the second operation information while following an instruction indicated by the second operation information. Accordingly, when the robot 300 executes operations, it is possible to move a first workpiece and a second workpiece to positions appropriate for the operations, respectively. For example, in the above-mentioned example of the capacitor 20, when the electronic substrate 50 into which the capacitor 20 is inserted is not accurately disposed at a determined position, or even when a workpiece such as the capacitor 20 has insertion legs of different lengths, it is possible to more reliably move the capacitor 20 to a appropriate insertion position.

Here, the first operation information and the second operation information are not limited to the above-mentioned definition. That is, the reception unit 110 receives operation information to align a first portion of a workpiece with a first target as the first operation information, and operation information to bring a second portion such as a portion of the workpiece or a portion of the robot close to a second target as the second operation information. When the information is defined in this manner, in the embodiment, it is possible to use various pieces of operation information.

Figure 2:
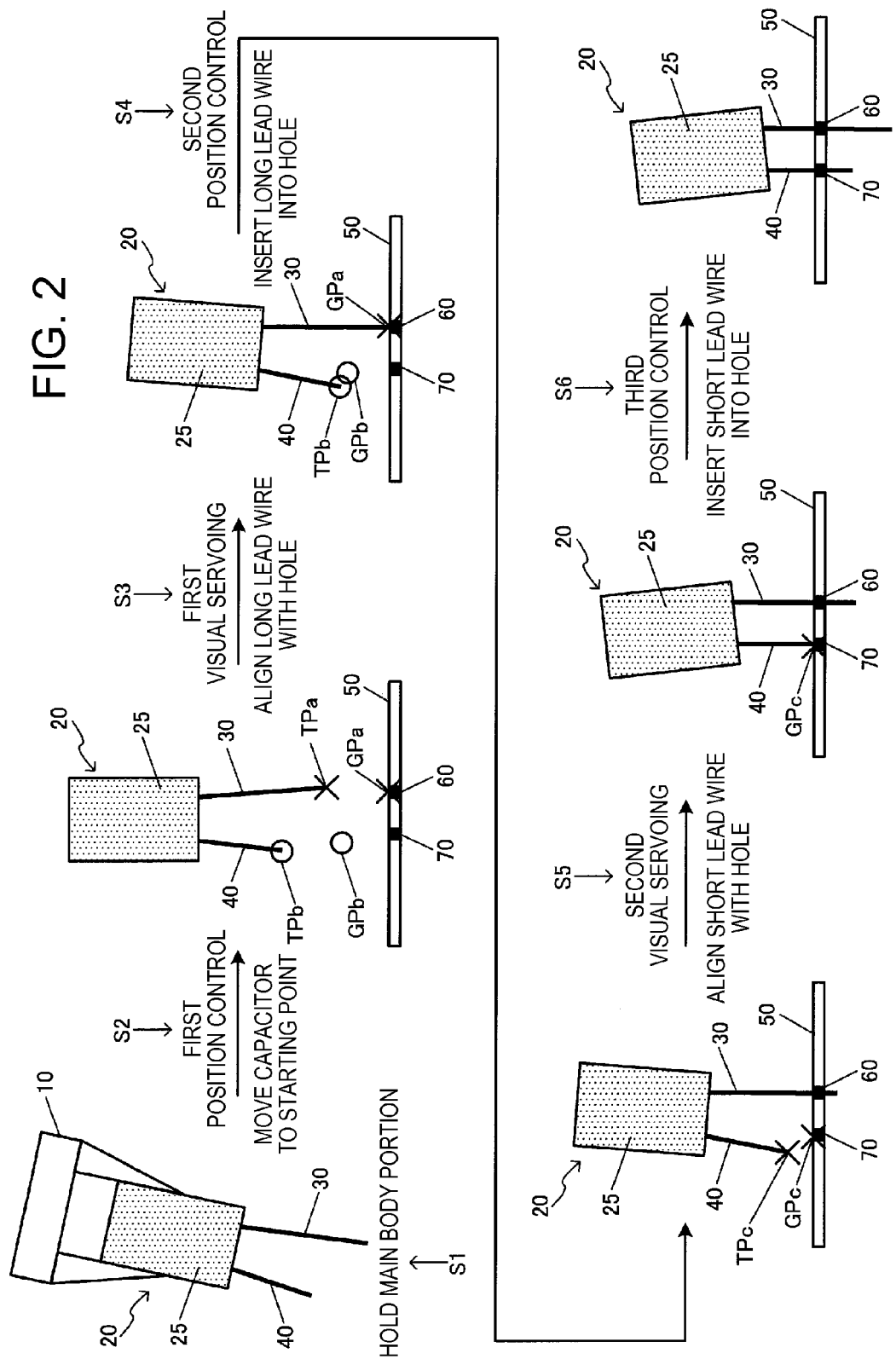
FIG. 2 is a first flowchart of a control process.

For example, in step S5 of FIG. 2, when the short lead wire 40 is aligned with the second hole 70, a high-priority first operation is an operation of aligning the short lead wire 40 (the first portion) of the capacitor 20 (the workpiece) with the position (the first target) of the second hole 70. As illustrated in FIG. 9B, a low-priority second operation is an operation through which a posture R of a hand 10 (the second portion) of the robot 300 is not changed as much as possible from a posture Rg (the second target) when visual servoing is started. The fact that the posture R of the hand 10 is not changed from the posture Rg as much as possible indicates that the posture R is as close to the posture Rg (the second target) as possible.

Figure 11:
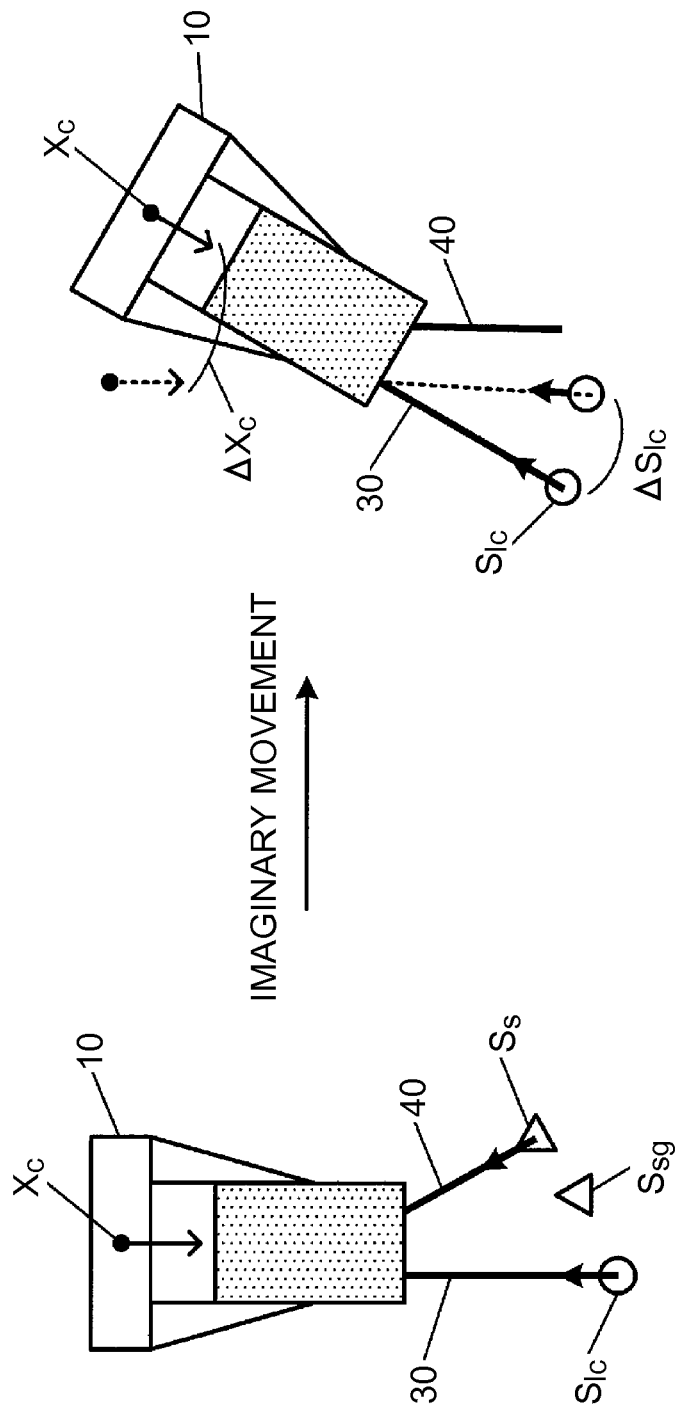
FIG. 11 illustrates views describing the fourth control method of the visual servoing.

Alternatively, the first operation is the same as above, but as illustrated in FIG. 11, the second operation may be an operation through which the deformation of the long lead wire 30 (the second position) is minimized when the short lead wire 40 is moved toward the second hole 70. The second target is the position of the long lead wire 30 which is bound by the first hole 60. When the long lead wire 30 is not assumably bound by the first hole 60, the control device 100 estimates an imaginary movement distance (a change ΔSlc in an image feature) of the long lead wire 30 when the short lead wire 40 is moved, and execute visual servoing so as to minimize the imaginary movement distance. The fact that the imaginary movement distance of the long lead wire 30 becomes minimized indicates that the position of the long lead wire 30 is as close to the position of the long lead wire 30 bound by the first hole 60 as possible.

The first portion of the workpiece is aligned with the first target by the reception of the operation information. In a range where the operation is realized, the second portion (a portion of the workpiece or a portion of the robot) is brought as close to the second target as possible by the reception of the operation information. Accordingly, it is possible to appropriately move the workpiece based on two pieces of different operation information. That is, it is possible to realize the high-priority first target, and dispose the second portion at a more appropriate position.

Here, the fact that the first portion is aligned with the first target indicates that the first portion faces the first target (the vicinity of the first target). For example, in step S3 of FIG. 2, when a tip of the long lead wire 30 faces (that is, is aligned with) an entrance of the first hole 60, the first portion is aligned with the first target. The first portion may be aligned with the first target by holding the electronic substrate 50 and then getting the entrance of the first hole 60 to face the tip of the long lead wire 30.

Bringing the second portion and the second target close to each other shortens a distance between the second portion and the second target. For example, in step S3 of FIG. 2, when a tip of the short lead wire 40 is moved toward (that is, is brought close to) a position above the second hole 70, a distance between the tip of the short lead wire 40 and the second hole becomes shortened. The distance between the tip of the short lead wire 40 and the second hole may be shortened by holding the electronic substrate 50 and then moving the position above the second hole 70 toward the tip of the short lead wire 40.

A portion of the workpiece is not limited to a linear portion such as the lead wire of the capacitor 20. For example, a portion of the workpiece may be a protrusion protruding from a main body portion of the workpiece; a portion (for example, a tip of a driver) of a tool, the portion acting on a member; a portion of a jig, the portion being in contact with a member; or the like. Alternatively, in contrast, a portion of the workpiece may be a hole portion opened in the main body portion of the workpiece; a member (for example, a screw) operated by a tool; a member to which a jig is applied; or the like. At this time, the robot 300 holds the hole portion or the member with the hand, and brings the hole portion or the member close to the protrusion, the tool, or the jig.

The operations of the robot 300 based on the operation information can be realized as follows. That is, the process unit 120 executes a process of aligning a first feature corresponding to the first target with a first target feature corresponding to the first target; and a process of bringing a second feature corresponding to the second portion close to a second target feature corresponding to the second target.

Figure 6:
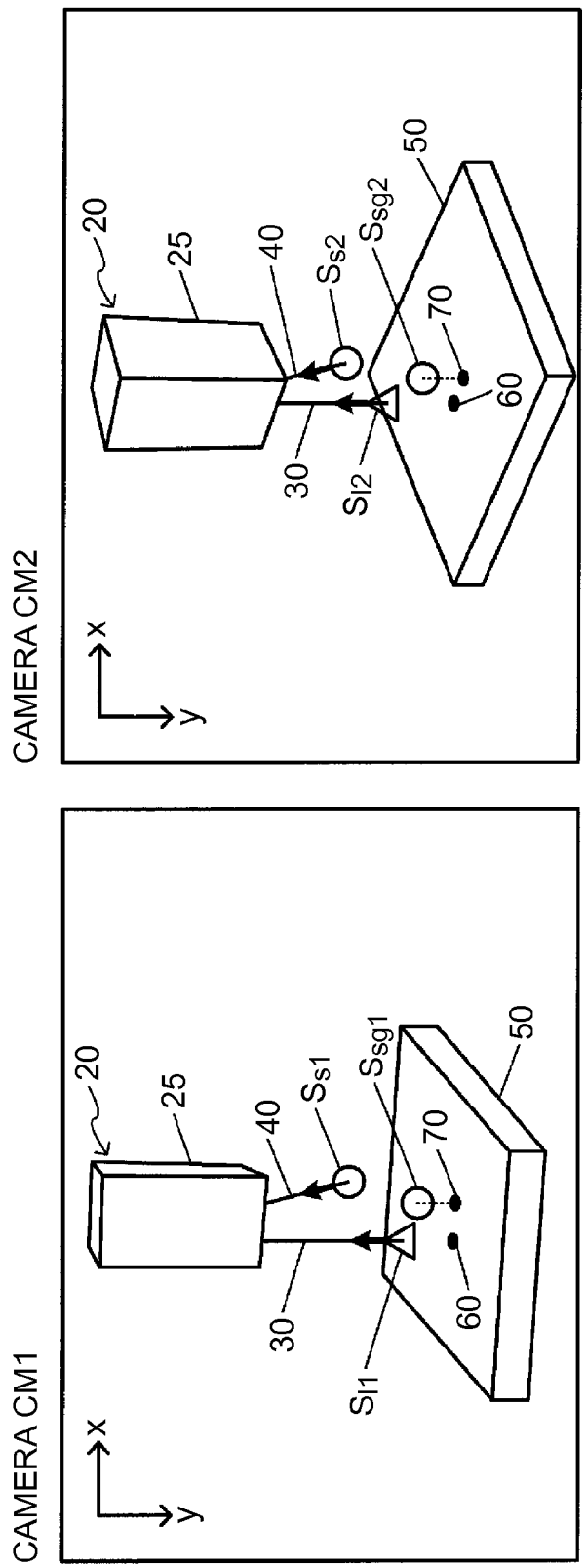
FIG. 6 illustrates captured images in a second control method of the visual servoing.
Figure 7:
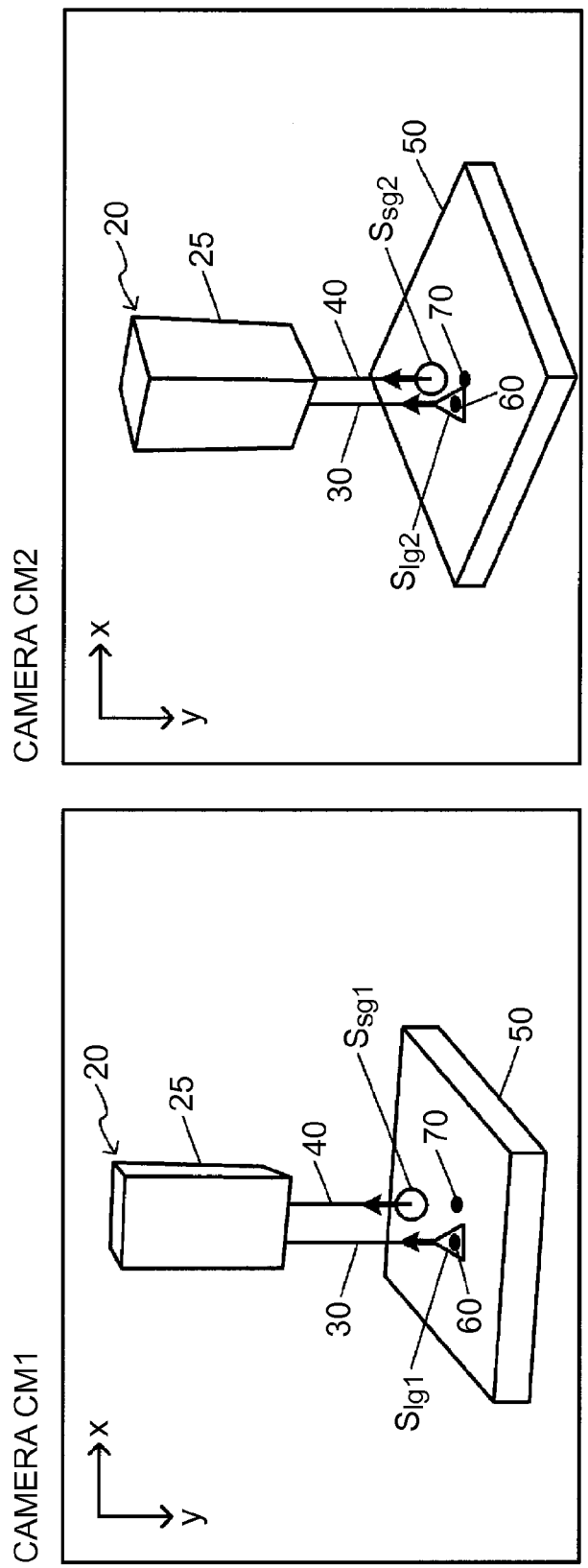
FIG. 7 illustrates reference images in the second control method of the visual servoing.

The description of visual servoing to align the long lead wire 30 with the first hole 60 will be given as an example. As illustrated in FIG. 6, the first features are image features Sl1 and Sl2 of the long lead wire 30, and the second features are image features Ss1 and Ss2 of the short lead wire 40. As illustrated in FIG. 7, the first target features are image features Slg1 and Slg2 of the long lead wire 30 when the long lead wire 30 is aligned with the first hole 60, and the second target features are image features Ssg1 and Ssg2 of the short lead wire 40 when the long lead wire 30 is aligned with the first hole 60. The process unit 120 allows the robot 300 to execute two different operations by aligning the features and the target features with each other, or bringing the features and the target features close to each other.

Figure 12:
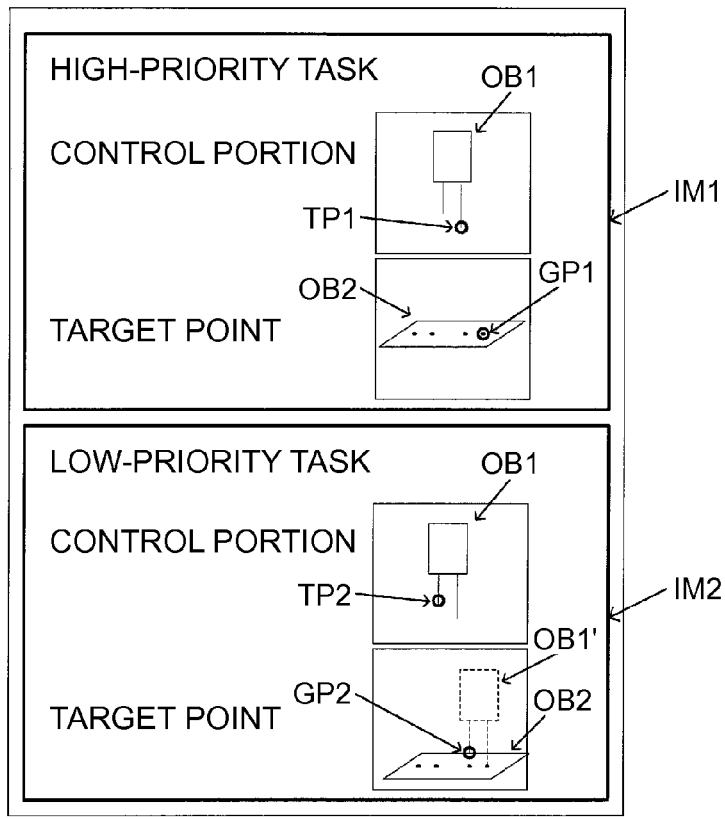
FIG. 12 is a first example of a display screen.
Figure 13:
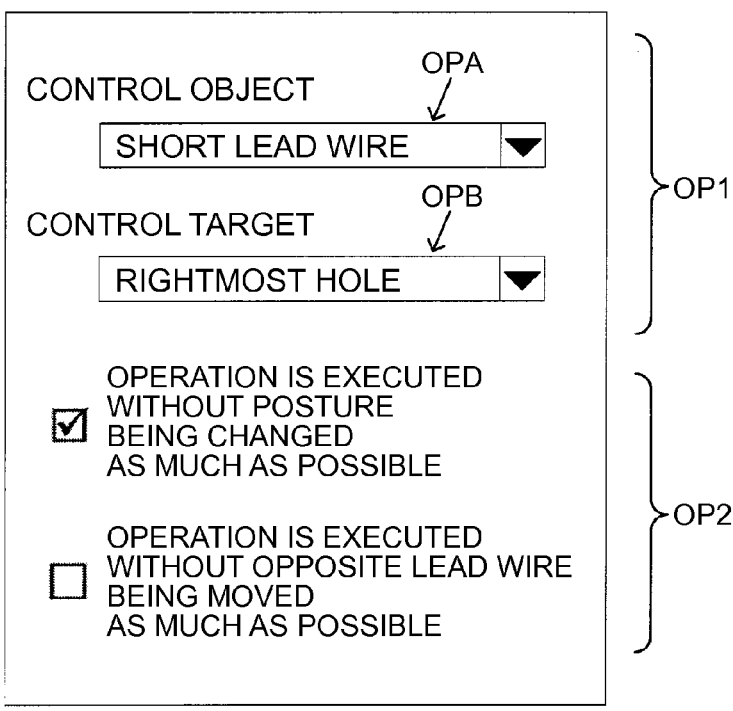
FIG. 13 is a second example of the display screen.

The features and the target features are determined by the first operation information and the second operation information which are received by the reception unit 110. For example, as illustrated in FIG. 12, direct designations of a portion and a target point may determine features and target features which correspond thereto. Alternatively, as illustrated in FIG. 13, the designation of an operation to be executed by the robot 300 may indirectly determine features and target features necessary for the operation. For example, it is preferred that the control device 100 store a correlation relationship between an operation, and features and target features.

As described above, the first operation information and the second operation information have different priorities. The different priorities indicate that the process unit 120 instructs the robot 300 to execute an operation based on the first operation information earlier than an operation based on the low-priority second operation information.

That is, when the process unit 120 executes a task instructed by the operation information, and the execution of the task causes the robot 300 to operate, the high-priority operation information indicates that the instruction is accomplished at a higher rate. For example, first and second tasks are executed in the insertion operation of the long lead wire 30. In the first task, the long lead wire 30 is aligned with the first hole 60, and in the second task, the short lead wire 40 is brought close to the second hole 70. At this time, even though the short lead wire 40 is merely brought close to the second hole 70, and is not aligned with the second hole 70, and the second task is accomplished at a low rate, the long lead wire 30 is aligned with the first hole 60, and the first task is accomplished at a high rate.

If the operation information with different priorities is more specifically described, the first operation information is information of an operation that is executed at a degree of freedom lower than that of the position and posture of an end effector of the robot 300. In addition, the second operation information is information of an operation that is executed at a redundant degree of freedom of the position and posture of the end effector in the operation based on the first operation information.

Figure 5:
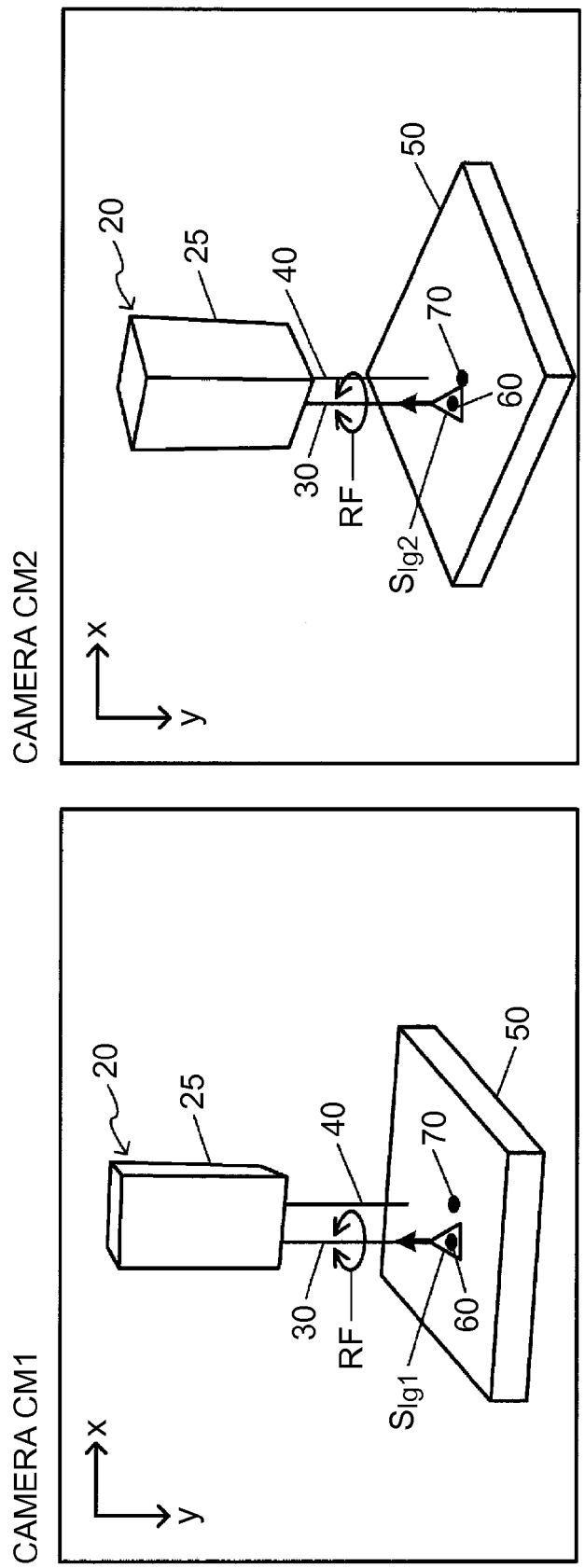
FIG. 5 illustrates reference images in the first control method of the visual servoing.

For example, as illustrated in FIG. 5, when the tip of the long lead wire 30 is aligned with the first hole 60, and the direction of the long lead wire 30 is aligned with an insertion direction, there exists a degree of freedom of a rotational direction RF about the axis of the long lead wire 30. That is, it is possible to execute the alignment operation of the long lead wire 30 and the first hole 60 at five degrees of freedom. Since the hand 10 has six degrees of freedom of a position and a posture, the alignment operation of the long lead wire 30 and the first hole 60 has a degree of freedom lower than the six degrees of freedom. The rotational direction RF is a redundant degree of freedom of the hand 10, and the rotation of the capacitor 20 in the rotational direction RF is controlled based on the second operation information. The short lead wire 40 is brought close to the second hole 70 via the operation. Since the operation is limited to the rotation about the long lead wire 30, as illustrated in FIG. 6, when the short lead wire 40 is bent, the short lead wire 40 is not always aligned with the second hole 70. That is, the second operation executed at the redundant degree of freedom has a priority lower than that of the first operation.

A third configuration example of the control device 100 will be described with reference to FIG. 1A. The third configuration example of the control device 100 includes the reception unit 110 and the process unit 120.

The control device 100 instructs the robot 300 to assemble a first workpiece including a first main body portion, a first portion, and a second portion, and a second workpiece including a first hole portion and a second hole portion.

Specifically, the reception unit 110 receives a plurality of captured images of an imaged target object, which are captured multiple times at different times while the robot 300 moves from the first posture to the second posture different from the first posture. For example, the reception unit 110 is an interface that connects the imaging unit 200 and the control device 100. That is, the imaging unit 200 captures images of the imaged target object in time series, and the plurality of images captured in time series are input to the control device 100 via the interface.

The process unit 120 instructs the robot 300 to execute the first operation and the second operation using the plurality of captured images received by the reception unit 110. Here, in the first operation, the first portion of the first workpiece is brought close to the first hole portion of the second workpiece, and in the second operation, the second portion of the first workpiece is brought close to the second hole portion of the second workpiece. Specifically, the process unit 120 controls the robot 300 using visual servoing based on the images captured in time series, and instructs the robot 300 to execute the first and second operations. For example, the process unit 120 is configured by a CPU, a GPU, or the like.

For example, in the assembly operation of the capacitor 20 illustrated in FIG. 2, the first workpiece is the capacitor 20, and the second workpiece is the electronic substrate 50. The capacitor 20 includes a main body portion 25; the long lead wire 30 that is the first portion; and the short lead wire 40 that is the second portion. The electronic substrate 50 is provided with the first hole 60 that is the first hole portion; and the second hole 70 that is the second hole portion.

In a process flow illustrated in FIG. 2, operations of bringing the long lead wire 30 and the short lead wire 40 close to the first hole 60 and the second hole 70, respectively, are executed using first visual servoing (step S3), a second position control (step S4), and second visual servoing (step S5). That is, the first and second operations are not required to be realized using one consecutive time of visual servoing, and may be realized using a series of controls including multiple times of visual servoing. In the process flow illustrated in FIG. 2, the position control is inserted between the visual servoing, but the operations of bringing the lead wires close to the holes are realized using the visual servoing.

Figure 14:
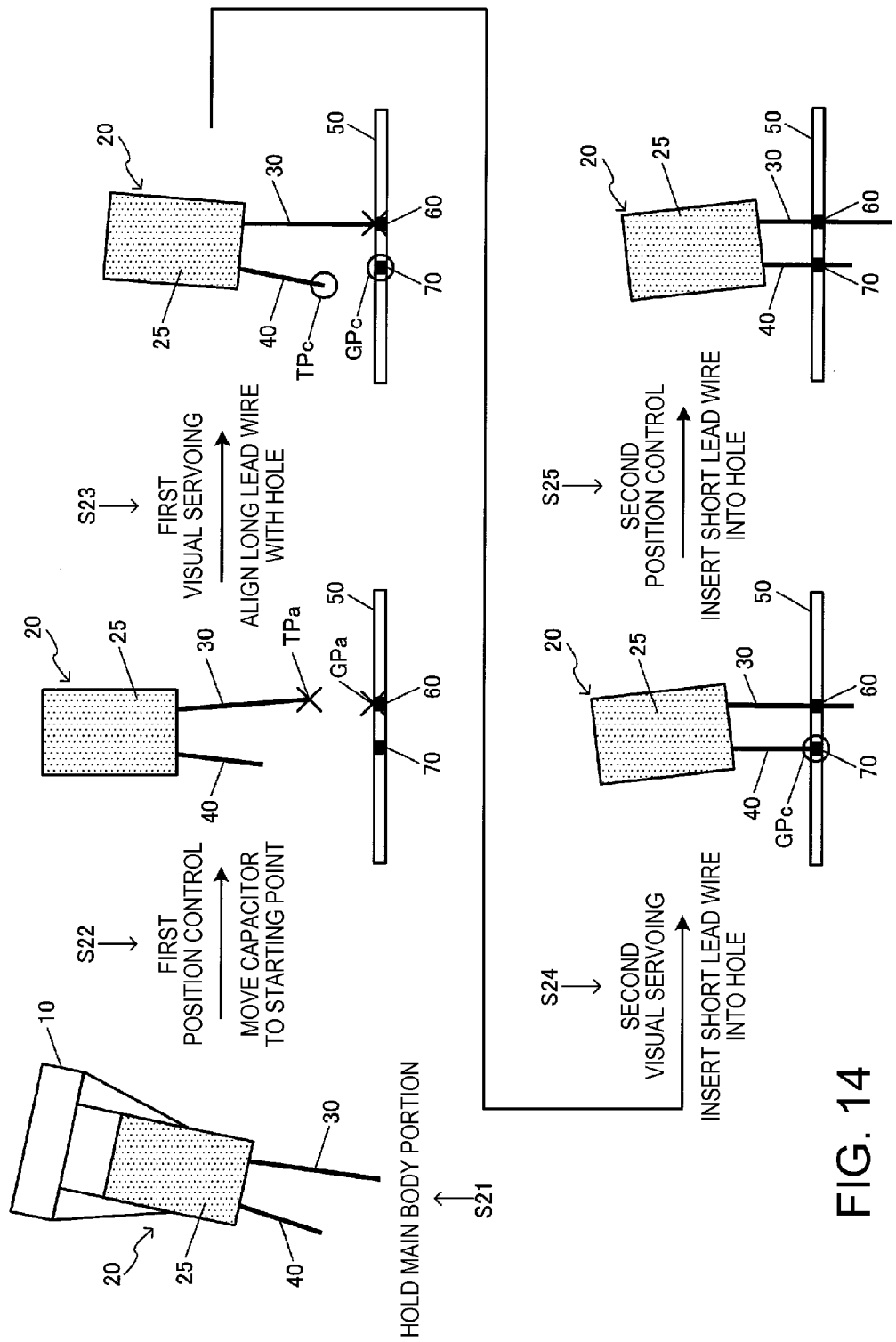
FIG. 14 is a second flowchart of the control process.

The first and second operations may be controlled as per a process flow illustrated in FIG. 14. In this process flow, operations of bringing the long lead wire 30 and the short lead wire 40 close to the first hole 60 and the second hole 70, respectively, are executed using the first visual servoing (step S23) and the second visual servoing (step S24). As such, the process flow does not include the position control, and the first and second operations may be executed using two consecutive times of the visual servoing.

In an assembly operation of a resistor element 80 which will be described with reference to FIG. 15, the first workpiece is the resistor element 80, and the second workpiece is the electronic substrate 50. The resistor element 80 includes a main body portion 85; a first lead wire 35 that is the first portion; and a second lead wire 45 that is the second portion. The electronic substrate 50 is provided with a third hole 65 that is the first hole portion; and a fourth hole 75 that is the second hole portion.

Figure 15:
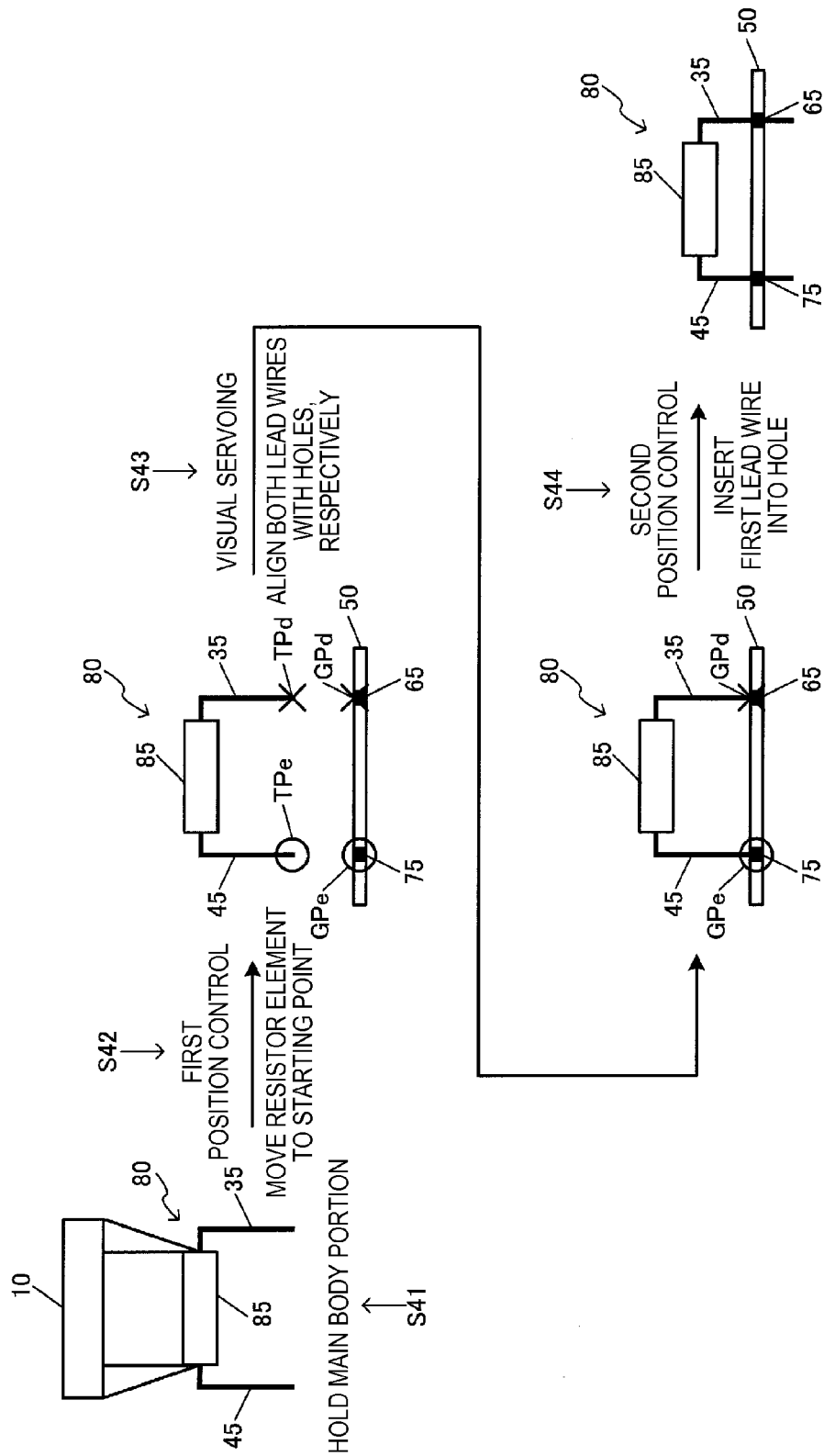
FIG. 15 is a third flowchart of the control process.

In a process flow illustrated in FIG. 15, operations of bringing the first lead wire 35 and the second lead wire close to the third hole 65 and the fourth hole 75, respectively, are executed using visual servoing (step S43). As such, the first and second operations may be simultaneously executed in one time of visual servoing.

As described above, in the embodiment, it is possible to bring the first portion of the first workpiece close to the first hole portion of the second workpiece, and bring the second portion of the first workpiece close to the second hole portion of the second workpiece, using the visual servoing. For example, even though the electronic substrate 50 into which the capacitor 20 is inserted is not accurately located at a determined position, it is possible to move the capacitor 20 to an appropriate insertion position because a positional relationship between the capacitor 20 and the electronic substrate 50 is figured out via an image when the visual servoing is used. When the robot 300 executes operations, it is possible to move the first and second workpieces according to a positiontional relationship appropriate for the operations, using the visual servoing.

Here, to bring a portion and a hole portion close to each other shortens a distance between the portion and the hole portion. For example, in step S3 of FIG. 2, when the tip of the long lead wire 30 is moved toward (that is, is brought close to) the entrance of the first hole 60, the distance between the portion and the hole portion becomes shortened. The distance between the portion and the hole portion may be shortened by holding the electronic substrate 50 and then moving the entrance of the first hole 60 toward the tip of the long lead wire 30.

A portion of the workpiece is not limited to a linear portion such as the lead wire of the capacitor 20. For example, a portion of the workpiece may be a convex portion (protrusion) protruding from a main body portion of the workpiece. A hole portion of the workpiece is not limited to a thin through hole such as a hole for the insertion of the lead wire. For example, a hole portion of the workpiece may be a hole that does not pass through the workpiece, or a concave portion into which a convex portion is fitted.

In the above-mentioned assembly operation of the capacitor 20, the two lead wires have different lengths. When the first portion has a length greater than that of the second portion, the process unit 120 instructs the robot 300 to execute the first operation earlier than the second operation.

For example, in the process flow illustrated in FIG. 2, the long lead wire 30 is brought close to the first hole 60 using the first visual servoing (step S3), then the long lead wire 30 is inserted into the first hole 60 using the second position control (step S4), and then the short lead wire 40 is brought close to the second hole 70 using the second visual servoing (step S5).

Alternatively, in the process flow illustrated in FIG. 14, the long lead wire 30 is brought close to the first hole 60 using the first visual servoing (step S23), and the short lead wire 40 is brought close to the second hole 70 while the long lead wire 30 is inserted into the first hole 60, using the second visual servoing (step S24).

It is possible to assemble workpieces in a sequence appropriate for the respective shapes of the workpieces by executing the first and second operations in a sequence. That is, when the first workpiece is brought close to the second workpiece, after (or while) a long portion reaching a hole portion in advance of a short portion is first brought close to a hole portion, and is inserted into the hole portion, the short portion reaching a hole portion subsequent to the long portion can be brought close to the hole portion. Accordingly, it is possible to execute a smooth and reliable assembly operation.

Here, the length of the portion indicates a length in an insertion direction of the portion with respect to the hole portion. For example, the lead wire extends from a bottom surface of the main body portion, but the length of the lead wire indicates a length from the bottom surface of the main body portion to the tip of the lead wire. The length is equivalent to the length of the lead wire in the insertion direction (that is, a direction along the lead wire) of the lead wire with respect to the hole portion.

In the above-mentioned assembly operation of the resistor element 80, the two lead wires have the same length. When the first portion has the same length as the second portion, the process unit 120 instructs the robot 300 to simultaneously execute the first and second operations.

For example, in the process flow illustrated in FIG. 15, the first lead wire 35 and the second lead wire 45 are simultaneously brought close to the third hole 65 and the fourth hole 75, respectively, using one time of visual servoing (step S43). The simultaneity does not mean that the lead wires are simultaneously brought close to the hole portions, respectively, but means that the two operations are controlled in one time of visual servoing. That is, even though the lead wires are respectively brought close to the hole portions at different times, it is preferred that the two lead wires be brought close to the hole, respectively, using visual servoing.

When the first and second operations are executed not in a sequence but simultaneously, it is possible to efficiently proceed with an operation of a workpiece such as the resistor element with the lead wires of the same length. For example, as in the process flow of FIG. 15, when the two lead wires are respectively brought close to the holes using onetime of visual servoing, it is possible to reduce the number of steps of the operation, and simplify an insertion operation of the resistor element.

Here, the fact that the lengths are the same is not limited to a case in which the lengths are perfectly equal, and includes a case in which the lengths are substantially the same. For example, when the respective tips of two lead wires face two holes, respectively, and the lead wires are substantially perpendicular to the electronic substrate 50, the lead wires can be respectively inserted into the holes. When two portions are simultaneously brought close to the hole portions, respectively, a difference in length is permissible insofar as the difference does not affect the insertion operation subsequent thereto.

2. First Control Process Flow

Subsequently, a control process will be described in detail with reference to an example in which the capacitor is assembled to the electronic substrate 50. FIG. 2 illustrates a first flowchart of the control process. An outline of each step will be described with reference to FIG. 2, and a detailed description of each step will be given later.

As illustrated in FIG. 2, the capacitor 20 includes the main body portion 25 that stores electric charges; the long lead wire 30 (the first portion) that is a positive electrode terminal of the capacitor 20; and the short lead wire 40 (the second portion) that is a negative electrode terminal of the capacitor 20. The electronic substrate 50 is provided with the first hole 60 (the first hole portion) and the second hole 70 (the second hole portion). The long lead 30 and the short lead wire 40 are respectively inserted into the first hole 60 and the second hole 70, and are mounted into the first hole 60 and the second hole 70 via soldering or the like, and thus the capacitor 20 and the electronic substrate 50 are assembled together.

When the control process is started, first, the hand 10 holds the main body portion 25 (step S1). Subsequently, the first position control causes the capacitor 20 to move to a starting point of visual servoing (step S2). The hand 10 is not illustrated in step S2 and the subsequent steps.

Here, the position control indicates a control that causes the position and posture of an end effector of the hand 10 or the like to move from a starting point to an ending point. In step S1, the starting point is the position and posture of the hand 10 when a holding operation is complete, and the ending point is the position and posture of the end effector at the starting point of the visual servoing. A trajectory from the starting point to the ending point is generated, and the joint angle or the joint angular velocity of the arm is controlled based on the trajectory, and the end effector is moved along the trajectory.

Subsequently, a feater point TPa of the long lead wire 30 is aligned with a target point GPa using the first visual servoing, and a feater point TPb of the short lead wire 40 is brought as close to a second target point GPb as possible (step S3). The feater point and the target point are designated by the position of the tip of the lead wire and the direction of the lead wire. In FIG. 2, the feater point and the target point of a high-priority operation are depicted with X marks, and the feater point and the target point of a low-priority operation are depicted with O marks. The target point GPa is present at the entrance of or directly above the first hole 60, and the target point GPb is present above the second hole 70. The target points GPa and GPb are present at respective heights from the electronic substrate 50, and are present at different positions by a difference in length between the long lead wire 30 and the short lead wire 40.

In this manner, the long lead wire 30 (the first portion) is aligned with the first hole 60 (the first hole portion). Here, the fact that the first portion is aligned with the first hole portion indicates that the first portion faces the first hole portion (the vicinity of the first hole portion). As in step S3, the first portion and the first hole portion may be aligned with each other by getting the tip of the long lead wire 30 to face (be aligned with) the entrance of the first hole 60, or the first portion and the first hole portion may be aligned with each other by holding the electronic substrate 50 and getting the entrance of the first hole 60 to face the tip of the long lead wire 30.

Subsequently, the second position control causes the capacitor 20 to move downward (the insertion direction), and the long lead wire 30 to be inserted into the first hole 60 (step S4). At this time, the short lead wire 40 is moved a distance remote from the second hole 70.

It is necessary to accurately bring the lead wire close to the hole so as to insert the lead wire into the hole. For this reason, the process unit 120 instructs the robot 300 to bring the lead wire close to the hole using visual servoing. Since a relative positional relationship between the lead wire and the hole is not always the same, the visual servoing is a technique appropriate for the operation. Since the movement direction is determined in the insertion operation of the lead wire, the process unit 120 can instruct that the robot 300 execute the insertion operation using the position control. Since the robot is directly controlled compared to the visual servoing that executes a feedback control using images, an operation time period can be shortened.

Subsequently, the feater point TPc of the short lead wire 40 is aligned with the target point GPc using the second visual servoing (step S5). The target point GPc is present directly above the second hole 70. When the long lead wire 30 and the short lead wire 40 project obliquely from the main body portion 25, or when the long lead wire 30 and the short lead wire 40 are bent, the long lead wire 30 is deformed as the feater point TPc of the short lead wire 40 is moved to the target point GPc. The deformation occurs because the long lead wire 30 is bound (inserted) by the first hole 60, for example, a root of the long lead wire 30 connected the main body portion 25 is deformed.

Since the process unit 120 instructs the robot 300 to deform the pre-inserted long lead wire 30 in the second operation, it is possible to insert the short lead wire 40 later. That is, since the lead wire and the hole are recognized via images in the visual servoing, it is possible to get the tip of the lead wire to face the hole, but this operation is realized by the deformation of the long lead wire 30. Since the tip of the short lead wire 40 is accurately aligned with a point directly above the second hole 70, when the capacitor 20 is merely moved downward thereafter, the short lead wire 40 can be inserted into the second hole 70.

Subsequently, the capacitor 20 is moved downward (the insertion direction) using a third position control, and the short lead wire 40 is inserted into the second hole 70 (step S6). At this time, the long lead wire 30, and the short lead wire 40 are respectively moved to complete assembly positions, for example, positions in which the long lead wire 30 and the short lead wire 40 are solderable to the first hole 60 and the second hole 70, respectively.

As described in step S4, a high-accuracy operation of aligning the lead wire with the hole is executed using the visual servoing, and thereafter, it is possible to use the position control for the insertion operation in which the movement direction is determined.

The process unit 120 executes the above-mentioned process flow based on an operation scenario corresponding to the process flow. For example, the operation scenario is stored in the storage unit (not illustrated) of the control device 100. The process unit 120 acquires the operation scenario from the storage unit, converts the operation scenario into specific control processes (for example, control information of a motor and the like), and controls the robot. The operation scenario is a scenario (a program) for causing the robot to execute an operation, and for example, is configured via the assembly of a plurality of sub-programs. Alternatively, the process unit 120 may generate and acquire the operation scenario. For example, only a desirable target state is input from the user (for example, via an input screen in FIGS. 12 and 13), and the process unit 120 generates an operation scenario to realize the target state.

In the process flow of the above-mentioned example, the hand 10 holds the capacitor 20, and assembles the capacitor 20 and the electronic substrate 50 that is installed on a jig or the like on a working stand. However, the hand 10 may hold the electronic substrate 50, and assemble the electronic substrate 50 and the capacitor 20 that is installed on a jig or the like on the working stand.

3. First Control Method (Basic Process) of Visual Servoing

A first control method of visual servoing will be described with reference to an example in which the long lead wire 30 is aligned with the first hole 60. The first control method of visual servoing is a basic control process of visual servoing. In the following example, two cameras (imaging units) are used, but the number of cameras may be one, or three or greater.

Figure 3:
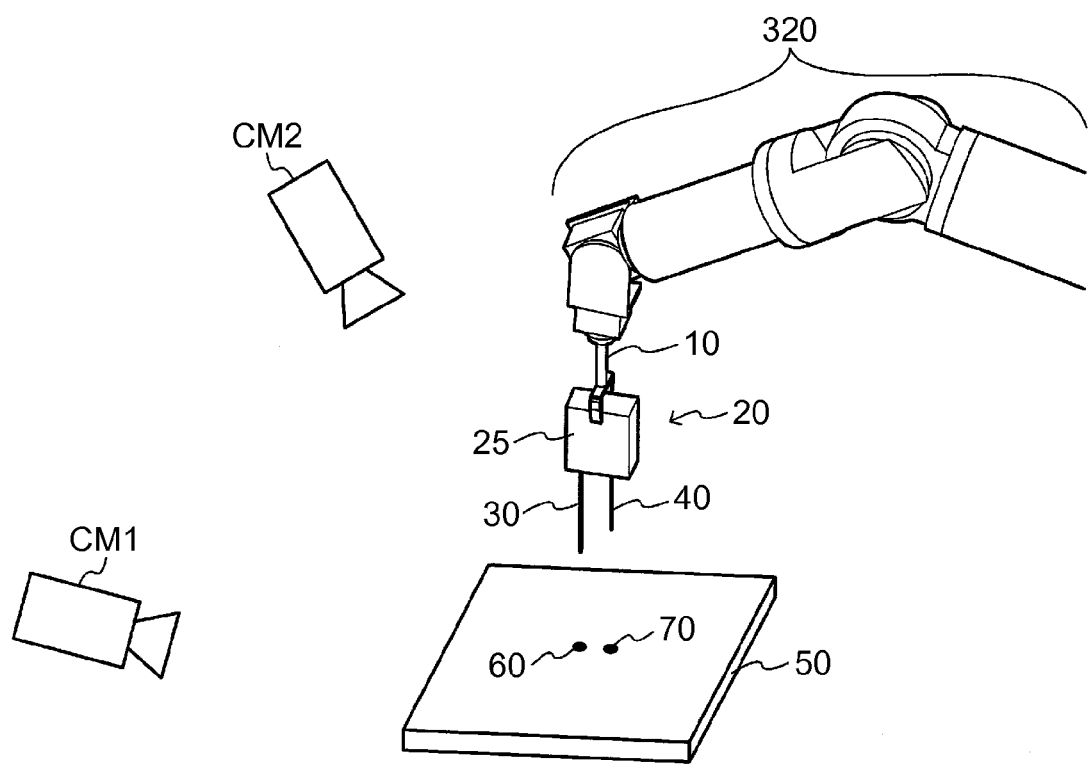
FIG. 3 illustrates a dispositional configuration example in visual servoing.

As illustrated in FIG. 3, in the visual servoing, images of the imaged target object are captured by a first camera CM1 and a second camera CM2, and the joint angle of an arm 320 or the position and posture of the hand 10 are controlled using the captured images. The imaged target objects are the capacitor 20 (the first workpiece) and the electronic substrate 50 (the second workpiece). The cameras CM1 and CM2 capture images (for example, video filming) in time series, and the control device 100 feedback-controls the arm 320 or the hand 10 using the captured image in each time frame. A flow of a feedback control will be described later with reference to FIGS. 16A and 16B.

Figure 4:
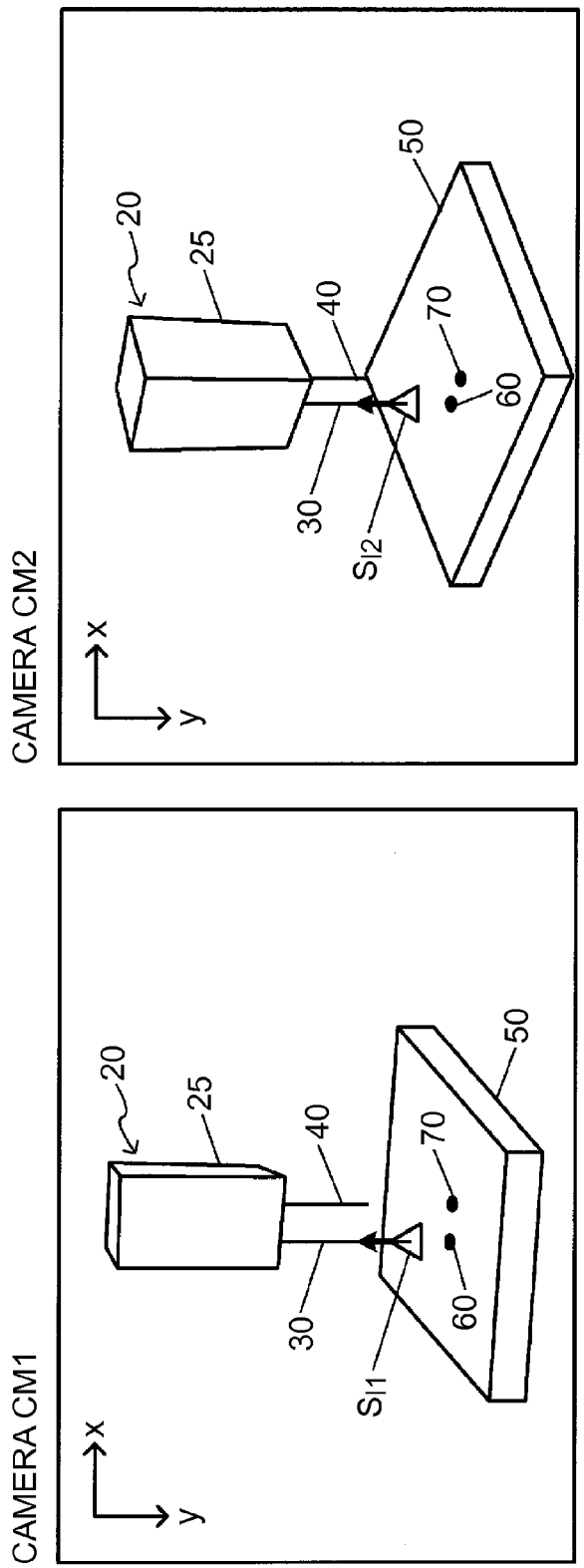
FIG. 4 illustrates captured images in a first control method of the visual servoing.

FIG. 4 illustrates images captured by the cameras CM1 and CM2, respectively. An image feature is detected from the captured image of the camera CM1, and is represented by the following formula (1), and an image feature is detected from the captured image of the camera CM2, and is represented by the following formula (2). The image features are detected via image recognition.

$$s_{I1} = [s_{xI1}\ s_{yI1}\ s_{\theta I1}]^T \qquad (1)$$

$$s_{I2} = [s_{xI2}\ s_{yI2}\ s_{\theta I2}]^T \qquad (2)$$

A position on an image is indicated by (x, y). SI1=(Sxl1, Syl1), and SI2=(Sxl2, Syl2) indicate the positions of the tip of the long lead wire 30 on the captured images, respectively, and are depicted with Δ marks in FIG. 4. For example, (x, y) is orthogonal coordinates, x corresponds to a horizontal scanning direction, and y corresponds to a vertical scanning direction. Sθl1 and Sθl2 are angles of the long lead wire 30 on the captured images, respectively, and are respectively depicted with arrows attached to Δ marks in FIG. 4. For example, the angle on the image is an angle formed by an X axis and the long lead wire 30, and right angles in the embodiment. A subscript "T" indicates a vector or the transpose of a matrix.

The respective image features Sl1 and Sl2 of the camera CM1 and CM2 define the position and posture of the long lead wire 30 in a three-dimensional operation space. At this time, since the rotation (the RF in FIG. 5) about the long lead wire 30 is free, the position and posture of the long lead wire 30 have five degrees of freedom. For this reason, an image feature Sl of the long lead wire 30 is represented by the following formula (3).

$$s_l = [s_{xl1} \; s_{yl1} \; s_{\theta l1} \; s_{xl2} \; s_{\theta l2}]^T \quad (3)$$

For example, when the cameras CM1 and CM2 are installed at the same height in the operation space, Syl1 is equal to Syl2, and thus the image feature Sl can be selected as by the formula (3). A method of selecting a vector element is not limited to the formula (3), and can be appropriately changed depending on the disposition of the cameras or the like.

FIG. 5 illustrates an example of reference images. In the visual servoing, the imaged target object is moved to a target on the captured image, and the target is the reference image. It is possible to estimate the position of the imaged target object based on a difference in a feature between the captured image and the reference image, and a feedback control is executed based on the estimation of the position.

An image feature is detected from the reference image of the camera CM1, and is represented by the following formula (4), and an image feature is detected from the reference image of the camera CM2, and is represented by the following formula (5).

$$s_{lg1} = [s_{xlg1} \; s_{ylg1} \; s_{\theta lg1}]^T \quad (4)$$

$$s_{lg2} = [s_{xlg2} \; s_{ylg2} \; s_{\theta lg2}]^T \quad (5)$$

(Sxlg1, Sylg1) and (Sxlg2, Sylg2) indicate the positions of the tip of the long lead wire 30 on the reference images, respectively, and Sθlg1 and Sθlg2 are angles of the long lead wire 30 on the reference images, respectively.

A target value Slg of the image feature Sl is represented by the following formula (6) using features Slg1 and Slg2 of the reference images.

$$s_{lg} = [s_{xlg1} \; s_{ylg1} \; s_{\theta lg1} \; s_{xlg2} \; s_{\theta lg2}]^T \quad (6)$$

In the embodiment, the respective images of the first hole 60 and the second hole 70 are recognized from the respective captured images of the cameras CM1 and CM2, and the target value Slg is set to correspond to the respective recognized positions of the first hole 60 and the second hole 70. That is, in the embodiment, the captured image is the reference image.

The reference image may be an image separate from the captured image, and for example, may be an image generated from CAD model data. The image features may be detected from the stored reference images, or the pre-detected image features may be stored.

As in the following formulas (7) and (8), a change Δθg in a target joint angle is obtained from the image feature Sl in the formula (3) and the target image feature Slg in the formula (6). By virtue of a control law, the change Δθg in a target joint angle is sequentially decided using the images captured in time series, and a joint angle is changed by the change Δθg, and thus it is possible to eliminate a difference between the feature Sl and the target image feature Slg of an actual image.

$$\Delta X = \lambda J_{il}^{\#}(s_{lg} - s_l) \quad (7)$$

$$\Delta \theta_g = J_a^{\#} \Delta X \quad (8)$$

In the formula (7), X indicates a position (x, y, z) and a posture (R1, R2, R3) of the hand 10 in the operation space as represented by the following formula (9). For example, the posture (R1, R2, R3) indicates a roll angle, a pitch angle, and a yaw angle. λ is a control gain. As represented by the following formula (10), Jil indicates a Jacobian between the position and posture of the workpiece and the image feature Sl of the long lead wire 30 in the operation space. Jil* is a pseudo-inverse matrix of the Jil.

$$X = [x \; y \; z \; R_1 \; R_2 \; R_3]^T \quad (9)$$

$$J_{il} = \begin{bmatrix} \frac{\partial s_{xl1}}{\partial x} & \frac{\partial s_{xl1}}{\partial y} & \frac{\partial s_{xl1}}{\partial z} & \frac{\partial s_{xl1}}{\partial R_1} & \frac{\partial s_{xl1}}{\partial R_2} & \frac{\partial s_{xl1}}{\partial R_3} \\ \frac{\partial s_{yl1}}{\partial x} & \frac{\partial s_{yl1}}{\partial y} & \frac{\partial s_{yl1}}{\partial z} & \frac{\partial s_{yl1}}{\partial R_1} & \frac{\partial s_{yl1}}{\partial R_2} & \frac{\partial s_{yl1}}{\partial R_3} \\ \frac{\partial s_{\theta l1}}{\partial x} & \frac{\partial s_{\theta l1}}{\partial y} & \frac{\partial s_{\theta l1}}{\partial z} & \frac{\partial s_{\theta l1}}{\partial R_1} & \frac{\partial s_{\theta l1}}{\partial R_2} & \frac{\partial s_{\theta l1}}{\partial R_3} \\ \frac{\partial s_{xl2}}{\partial x} & \frac{\partial s_{xl2}}{\partial y} & \frac{\partial s_{xl2}}{\partial z} & \frac{\partial s_{xl2}}{\partial R_1} & \frac{\partial s_{xl2}}{\partial R_2} & \frac{\partial s_{xl2}}{\partial R_3} \\ \frac{\partial s_{\theta l2}}{\partial x} & \frac{\partial s_{\theta l2}}{\partial y} & \frac{\partial s_{\theta l2}}{\partial z} & \frac{\partial s_{\theta l2}}{\partial R_1} & \frac{\partial s_{\theta l2}}{\partial R_2} & \frac{\partial s_{\theta l2}}{\partial R_3} \end{bmatrix} \quad (10)$$

In the formula (8), θg is a vector of the target joint angle as represented by the following formula (11). The following formula (11) represents an example in which a six degree-of-freedom arm is used. As represented by the following formula (12), Ja indicates a Jacobian between the joint angle of the arm and the position and posture of the workpiece in the operation space. Ja* is a pseudo-inverse matrix of the Ja.

$$\theta_g = [\theta_{g1} \; \theta_{g2} \; \theta_{g3} \; \theta_{g4} \; \theta_{g5} \; \theta_{g6}]^T \quad (11)$$

$$J_a = \begin{bmatrix} \frac{\partial x}{\partial \theta_1} & \frac{\partial x}{\partial \theta_2} & \frac{\partial x}{\partial \theta_3} & \frac{\partial x}{\partial \theta_4} & \frac{\partial x}{\partial \theta_5} & \frac{\partial x}{\partial \theta_6} \\ \frac{\partial y}{\partial \theta_1} & \frac{\partial y}{\partial \theta_2} & \frac{\partial y}{\partial \theta_3} & \frac{\partial y}{\partial \theta_4} & \frac{\partial y}{\partial \theta_5} & \frac{\partial y}{\partial \theta_6} \\ \frac{\partial z}{\partial \theta_1} & \frac{\partial z}{\partial \theta_2} & \frac{\partial z}{\partial \theta_3} & \frac{\partial z}{\partial \theta_4} & \frac{\partial z}{\partial \theta_5} & \frac{\partial z}{\partial \theta_6} \\ \frac{\partial R_1}{\partial \theta_1} & \frac{\partial R_1}{\partial \theta_2} & \frac{\partial R_1}{\partial \theta_3} & \frac{\partial R_1}{\partial \theta_4} & \frac{\partial R_1}{\partial \theta_5} & \frac{\partial R_1}{\partial \theta_6} \\ \frac{\partial R_2}{\partial \theta_1} & \frac{\partial R_2}{\partial \theta_2} & \frac{\partial R_2}{\partial \theta_3} & \frac{\partial R_2}{\partial \theta_4} & \frac{\partial R_2}{\partial \theta_5} & \frac{\partial R_2}{\partial \theta_6} \\ \frac{\partial R_3}{\partial \theta_1} & \frac{\partial R_3}{\partial \theta_2} & \frac{\partial R_3}{\partial \theta_3} & \frac{\partial R_3}{\partial \theta_4} & \frac{\partial R_3}{\partial \theta_5} & \frac{\partial R_3}{\partial \theta_6} \end{bmatrix} \quad (12)$$

It is possible to obtain the Jacobian Jil by pre-measuring a change in the image feature Sl when the position and posture X of the hand 10 is minutely changed. At this time, it is preferred that a pre-obtained Jacobian be stored. Alternatively, the Jacobian Jil may be calculated using a method of estimating the position and posture of the hand 10 while moving the hand 10. It is possible to calculate the Jacobian Ja from a geometrical relationship between the joint angle and the link length of the robot.

For example, it is possible to obtain a pseudo-inverse matrix (general inverse matrix) using the following two methods. A first method is a method of obtaining an inverse matrix of a square matrix $A^T A$ in a m×n matrix A, and a pseudo-inverse matrix A* is obtained using the following formula (13).

$$A^\# = (A^T A)^{-1} A^T \tag{13}$$

A second method is a method using singular value decomposition. It is possible to decompose an arbitrary m × n matrix A using the following formula (14).

$$A = U \Sigma V^T \tag{14}$$

U is a m-dimensional normal orthogonal base, V is a n-dimensional normal orthogonal base, and Σ is a matrix having a singular value as a diagonal term. In other words, the U is a square matrix $AA^T$ having m numbers of eigenvectors as column vectors, the V is the square matrix $A^T A$ having n numbers of eigenvectors as row vectors, and the Σ is a matrix having the square root of an eigenvalue shared between the U and the V as a diagonal term.

It is possible to consider the A* in the following formula (15) as a matrix having the same properties as an inverse matrix of the A in the formula (14).

$$A^\# = V \Sigma^{-1} U^T \tag{15}$$

In the embodiment, in the first and second methods, it is possible to obtain an inverse Jacobian by setting the A to be equal to the Jil or the Ja.

It is possible to align the tip of the long lead wire 30 with the target point using the first control method. When the same process is executed using the image feature and target image feature (for example, Ss and Ssg illustrated in FIG. 10) of the short lead wire 40, it is possible to align the tip of the short lead wire 40 with the target point.

4. Second Control Method of Visual Servoing

Subsequently, a second control method of visual servoing will be described. This method is applicable to the first visual servoing described in step S3 of FIG. 2.

In the control law represented by the formulas (7) and (8) and used in the first control method, the operation of the hand 10 is not restricted in the rotational direction (the RF in FIG. 5) about the axis of the long lead wire 30. For this reason, it is possible to align the long lead wire 30 with the first hole 60, but the disposition angle of the short lead wire 40 in the rotational direction is not determined. Since it is necessary to respectively insert the two lead wires into the holes for the assembly of the capacitor 20, it is desirable to restrict the disposition of the short lead wire 40 to some extent. When there is no restriction in the rotational direction, the rotational angle may exceed an accomplishable range of the robot 300, and the robot 300 may not be able to accomplish an operation. Accordingly, it is desirable to restrict the disposition of the short lead wire 40 to some extent.

In the first visual servoing described in step S3 of FIG. 2, the control law includes an additional term of controlling a redundant degree of freedom in the rotation direction, thereby restricting an operation in the rotational direction. Specifically, the control law represented by the following formulas (16) and (17) is used.

$$\Delta X = \lambda J_{il}^\# (s_{lg} - s_l) + (I - J_{il}^\# J_{il}) \Sigma k_p \tag{16}$$

$$\Delta \theta_g = J_a^\# \Delta X \tag{17}$$

A first term in the formula (16) is as described in the formula (7). A second term I is a unit matrix. kp is a scalar quantity (control gain). ξ is a vector based on an evaluation function q(X) as represented by the following formulas (18) and (19).

$$\xi = [\xi_1 \ \xi_2 \ \xi_3 \ \xi_4 \ \xi_5 \ \xi_6]^T \tag{18}$$

$$\xi_i = \frac{\partial (q(X))}{\partial X_i} \tag{19}$$

In the formula (19), ξi is an i-th element of the ξ. Xi is an i-th element of the X in the formula (9). The evaluation function q(X) is defined by the following formula (20) using the image features Ss and Ssg of the short lead wire 40. Ssi and Ssgi are i-th elements of the Ss and the Ssg, respectively.

$$q(X) = -\sum_{i=1}^{5} (s_{sgi} - s_{si})^2 \tag{20}$$

The image features Ss and Ssg of the short lead wire 40 will be described. FIG. 6 illustrates the captured images for the first visual servoing, and FIG. 7 illustrates the reference images for the first visual servoing. The target point of the short lead wire 40 is the position of the tip of the short lead wire 40 and the direction of the short lead wire 40 when the feater point of the long lead wire 30 is aligned with the first hole 60. At this time, it is assumed that the long lead wire 30 and the short lead wire 40 are not bent. That is, the target point of the short lead wire 40 is a point that is separate upwards from the second hole 70 along the insertion direction of the short lead wire 40.

Similar to the long lead wire 30, the image features Ss1 and Ss2 are obtained from the respective captured images of the cameras, and the image feature Ss of the short lead wire 40 represented by the following formula (21) is obtained using the image features Ss1 and Ss2. The target value Ssg of the image feature of the short lead wire 40 is represented by the following formula (22).

$$s_s = [s_{xs1} \ s_{ys1} \ s_{\theta s1} \ s_{xs2} \ s_{\theta s2}]^T \tag{21}$$

$$s_{sg} = [s_{xsg1} \ s_{ysg1} \ s_{\theta sg1} \ s_{xsg2} \ s_{\theta xg2}]^T \tag{22}$$

It is possible to obtain the ξ of the formula (19) as follows. That is, a Jacobian Jis between the position and posture of the workpiece and the image feature Ss of the short lead wire 40 is represented by the following formula (23).

$$J_{is} = \begin{bmatrix} \frac{\partial s_{xs1}}{\partial x} & \frac{\partial s_{xs1}}{\partial y} & \frac{\partial s_{xs1}}{\partial z} & \frac{\partial s_{xs1}}{\partial R_1} & \frac{\partial s_{xs1}}{\partial R_2} & \frac{\partial s_{xs1}}{\partial R_3} \\ \frac{\partial s_{ys1}}{\partial x} & \frac{\partial s_{ys1}}{\partial y} & \frac{\partial s_{ys1}}{\partial z} & \frac{\partial s_{ys1}}{\partial R_1} & \frac{\partial s_{ys1}}{\partial R_2} & \frac{\partial s_{ys1}}{\partial R_3} \\ \frac{\partial s_{\theta s1}}{\partial x} & \frac{\partial s_{\theta s1}}{\partial y} & \frac{\partial s_{\theta s1}}{\partial z} & \frac{\partial s_{\theta s1}}{\partial R_1} & \frac{\partial s_{\theta s1}}{\partial R_2} & \frac{\partial s_{\theta s1}}{\partial R_3} \\ \frac{\partial s_{xs2}}{\partial x} & \frac{\partial s_{xs2}}{\partial y} & \frac{\partial s_{xs2}}{\partial z} & \frac{\partial s_{xs2}}{\partial R_1} & \frac{\partial s_{xs2}}{\partial R_2} & \frac{\partial s_{xs2}}{\partial R_3} \\ \frac{\partial s_{\theta s2}}{\partial x} & \frac{\partial s_{\theta s2}}{\partial y} & \frac{\partial s_{\theta s2}}{\partial z} & \frac{\partial s_{\theta s2}}{\partial R_1} & \frac{\partial s_{\theta s2}}{\partial R_2} & \frac{\partial s_{\theta s2}}{\partial R_3} \end{bmatrix} \tag{23}$$

Since it is possible to modify the ξi as represented by the following formula (24), it is possible to represent the ξ as in the following formula (25) using the Jacobian Jis.

$$\xi_i = \frac{\partial(q(X))}{\partial X_i} \quad (24)$$

$$= 2\bigg((s_{xsg1}-s_{xs1})\times\frac{\partial s_{xs1}}{\partial X_i}+(s_{ysg1}-s_{ys1})\times\frac{\partial s_{ys1}}{\partial X_i}+$$

$$(s_{\theta sg1}-s_{\theta s1})\times\frac{\partial s_{\theta s1}}{\partial X_i}+(s_{xsg2}-s_{xs2})\times\frac{\partial s_{xs2}}{\partial X_i}+$$

$$(s_{\theta sg2}-s_{\theta s2})\times\frac{\partial s_{\theta s2}}{\partial X_i}\bigg)$$

$$\xi = 2J_{is}^T(s_{sg}-s_s) \quad (25)$$

It is possible to obtain the Jacobian Jis by pre-measuring a change in the image feature Ss when the position and posture X of the hand 10 is minutely changed. Alternatively, the Jacobin J is may be calculated using a method of estimating the position and posture of the hand 10 while moving the hand 10.

The second term of the formula (16) serves to maximize the evaluation function q(X) represented by the formula (20). That is, the robot is controlled in such a manner that a sum of squares of elements of (Ssg–Ss) is minimized. It is possible to realize an operation of bring the image feature Ss of the short lead wire 40 close to the target image feature Ssg, using this control.

Here, the second term of the formula (16) does not change the image feature Sl of the long lead wire 30. That is, a change in the position and posture of the hand 10 occurring due to the second term does not cause the movement of the long lead wire 30. As described above, the first term of the formula (16) is used to control the long lead wire 30 at five degrees of freedom, but the second term is not involved in the five degrees of freedom of control. Since the position and posture of the hand 10 with six degrees of freedom has a redundant degree of freedom which is one remaining degree of freedom, the second term is used to control the hand 10 in a range of the redundant degree of freedom.

As described above, the high-priority first operation of aligning the long lead wire 30 with the first hole 60 is realized due to the first term of the formula (16). It is possible to realize the low-priority second operation of bringing the short lead wire 40 as close to the second hole 70 as possible by controlling an angle in the rotational direction about the axis of the long lead wire 30 using the second term.

Figure 8:
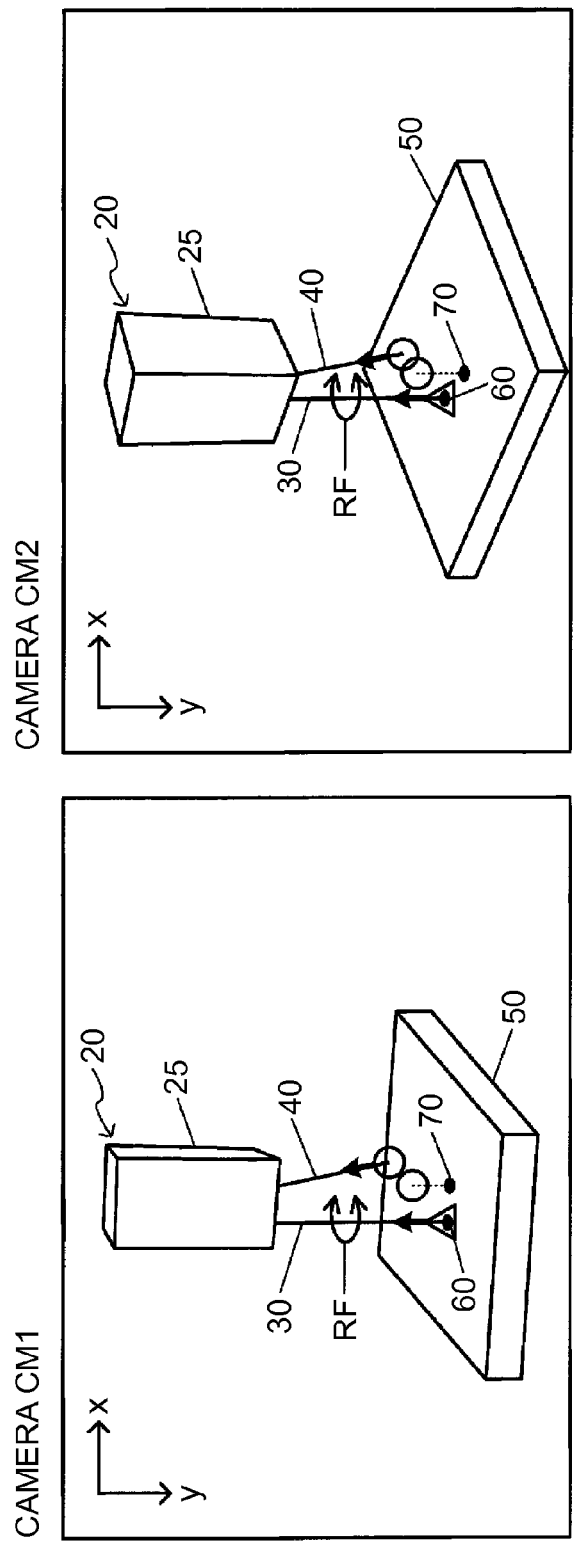
FIG. 8 illustrates views describing the second control method of the visual servoing.

As illustrated in FIG. 8, since a bent lead wire causes the short lead wire 40 not to be oriented directly downwards when the long lead wire 30 is aligned with the first hole 60, when the capacitor 20 is rotated about the long lead wire 30, the image feature Ss of the short lead wire 40 is not aligned with the target image feature Ssg. That is, the accomplishment rate of the operation of aligning the short lead wire 40 with the second hole 70 is lower than that of the operation of aligning the long lead wire 30 with the first hole 60, thereby causing a difference in priority. Since the short lead wire 40 is not perfectly aligned with the second hole 70, but can be brought as close to the second hole 70 as possible, it is possible to proceed to a subsequent operation (an operation of inserting the short lead wire 40 into the second hole 70) in a state where the short lead wire 40 is brought close to the target.

In a comparative example of a control of the redundant degree of freedom, it may be considered that an arm with a joint having seven degrees of freedom is controlled with respect to six degrees of freedom of the position and posture of the end effector. In the comparative example, when the position and posture of the end effector is determined, it is determined how to control a redundant degree of freedom of the joint of the arm. That is, the position and posture of the end effector are determined via a control, and thus the position and posture of the workpiece are determined.

In contrast, in the embodiment, a degree of freedom of the image feature SI of the long lead wire 30 is lower than six degrees of freedom of the end effector. That is, the position and posture of the end effector have a redundant degree of freedom, and the redundant degree of freedom is used for a control of how to bring the capacitor 20 close to the electronic substrate 50. In particular, it is possible to assign priorities to operations using the redundant degree of freedom of the end effector, and it is possible to simultaneously execute an operation that must be realized and an operation that is realized if possible.

5. Third Control Method of Visual Servoing

Subsequently, a third control method of visual servoing will be described. This method is applicable to the second visual servoing described in step S5 of FIG. 2.

Figure 9A:
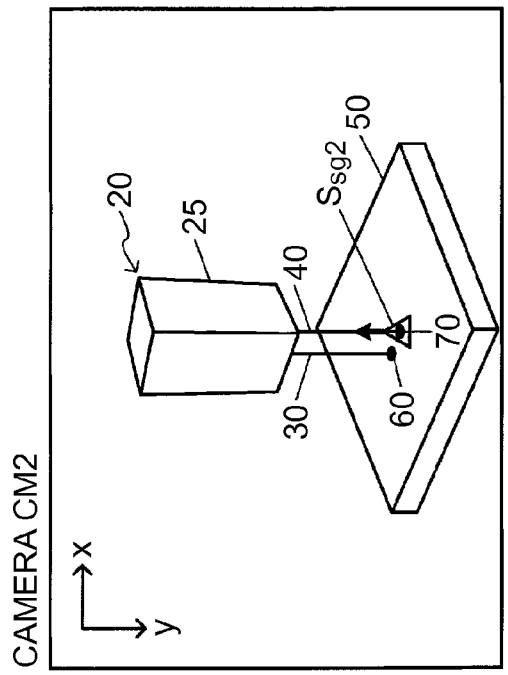
FIG. 9A illustrates reference images in a third control method of the visual servoing.
Figure 9B:
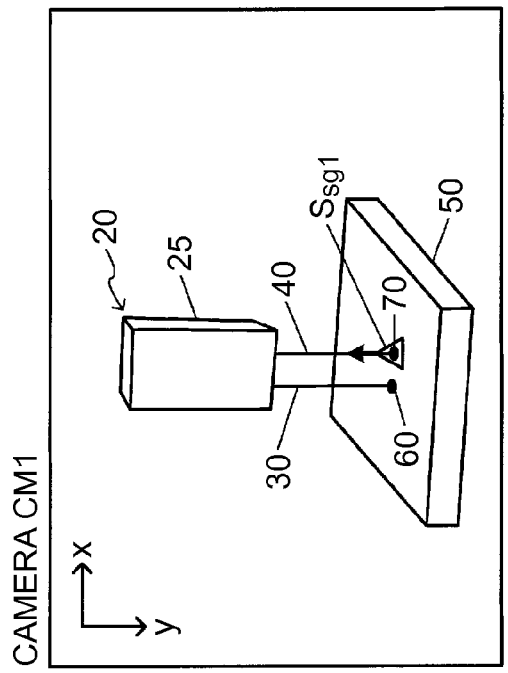
FIG. 9B illustrates views describing the third control method of the visual servoing.

FIG. 9A illustrates reference images for the second visual servoing. An object of the second visual servoing is that a part of the long lead wire 30 is stuck into the first hole 60, and the tip of the short lead wire 40 is aligned with the second hole 70. That is, the target point of the short lead wire 40 is present directly above the second hole 70.

In the second visual servoing, the above-mentioned operation becomes the high-priority first operation. The low-priority second operation is an operation in which the posture of the hand 10 is not changed as much as possible. Specifically, as illustrated in FIG. 9B, the target is a posture Rg of the hand 10 when the second visual servoing is started. The posture Rg is represented by the following formula (26).

$$R_g = [R_{1o}\ R_{2o}\ R_{3o}]^T \quad (26)$$

The evaluation function q(X) is defined by the following formula (27). The $\xi_i$ of the following formula (28) is obtained by the substitution of the evaluation function q(X) into the formula (19).

$$q(X) = -((R_{1o}-R_1)^2+(R_{2o}-R_2)^2+(R_{2o}-R_2)^2) \quad (27)$$

$$\xi_i = [0\ 0\ 0\ 2(R_{1o}-R_1)\ 2(R_{2o}-R_2)\ 2(R_{3o}-R_3)]^T \quad (28)$$

A control law is represented by the following formulas (29) and (30) using the $\xi$ of the formula (28).

$$\Delta X = -\lambda J_{is}^\#(s_s-s_{sg})+(I-J_{is}^\# J_{is})\xi k_p \quad (29)$$

$$\Delta\theta_g = J_a^\# \Delta X \quad (30)$$

$Jis^\#$ is a pseudo-inverse matrix of the Jacobian Jis of the formula (23). Parameters other than the $\xi$ are as described above.

A second term of the formula (29) is used to minimize (maximize the evaluation function q(X)) a sum of a square of a difference between a posture R=[R1, R2, R3]$^T$ and the target posture Rg of the hand 10. That is, the hand 10 is controlled in such a manner that the posture R is not changed from the posture Rg at the starting of the second visual servoing as much as possible.

A first term of the formula (29) is used to realize the first operation of aligning the short lead wire 40 with the second hole 70. The first operation has a redundant degree of freedom in a rotational direction about the axis of the short lead wire 40, and the use of the redundant degree of freedom realizes the second operation in which the posture R of the hand 10 is not changed as much as possible.

When the posture of the hand 10 is not restricted, the hand 10 can take a free posture in a range of the redundant degree of freedom when the short lead wire 40 is moved. For example, the hand 10 may move in a direction in which the long lead wire 30 is kept away from the first hole 60. At this time, since the long lead wire 30 is bound by the first hole 60, the long lead wire 30 is considerably deformed, and a subsequent insertion operation is adversely affected. It is possible to positively prevent a large movement of the hand 10, and the deformation of the long lead wire 30 as much as possible, using the second term of the formula (29).

This method is also applicable to the first visual servoing. That is, when the long lead wire 30 is aligned with the first hole 60, the hand 10 is controlled in order for the posture R not to be changed as much as possible, and thus the short lead wire 40 may be more appropriately positioned.

6. Fourth Control Method of Visual Servoing

Subsequently, a fourth control method of visual servoing will be described. This method is applicable to the second visual servoing described in step S5 of FIG. 2.

Figure 10:
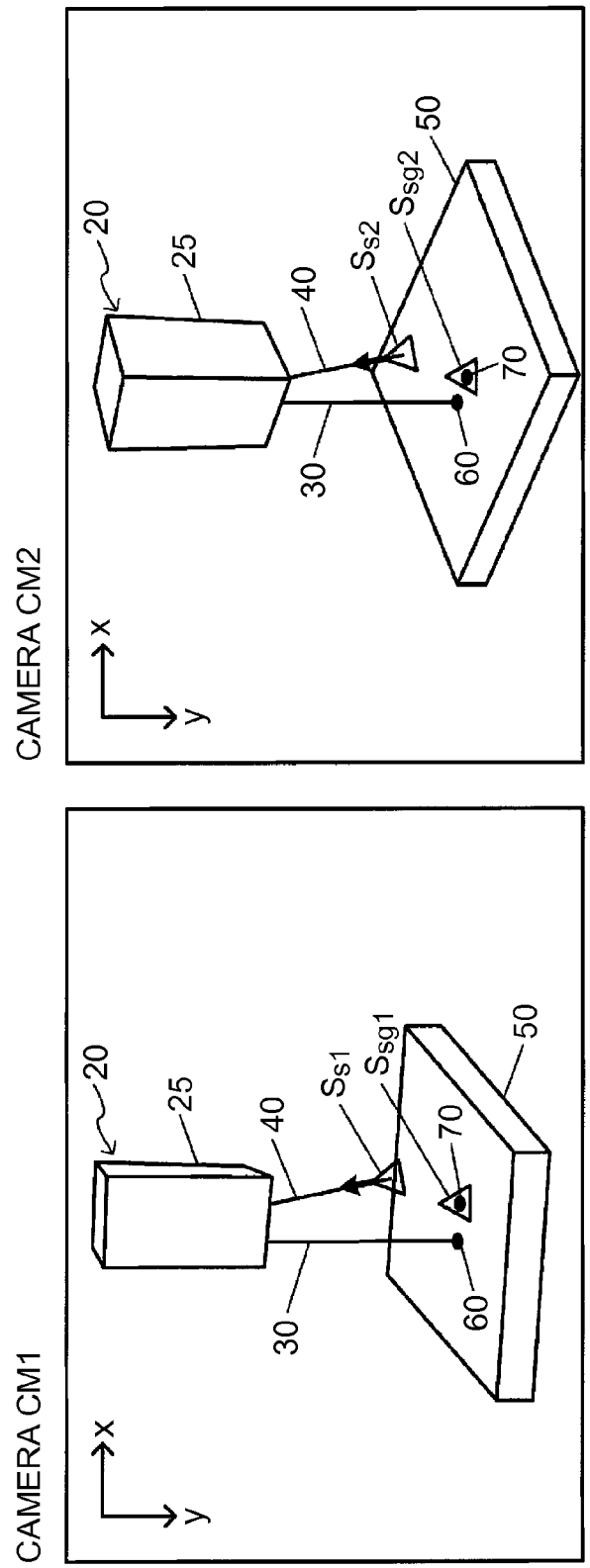
FIG. 10 illustrates captured images in a fourth control method of the visual servoing.

FIG. 10 illustrates the respective captured images of the cameras CM1 and CM2. Similar to the third control method, the high-priority first operation is an operation of aligning the image feature Ss of the short lead wire 40 with the target image feature Ssg. Unlike the third control method, the low-priority second operation is an operation in which the tip of the long lead wire 30 is not moved as much as possible.

FIG. 11 is a view describing the second operation. Since the tip of the long lead wire 30 is inserted into the first hole 60, and cannot be seen from the cameras CM1 and CM2, when it is assumed that the long lead wire 30 is not bound by the hole, a control is performed to minimize the movement of the tip of the long lead wire 30.

Control law formulas are the same as the formulas (29) and (30). The evaluation function q(X) is defined as follows. That is, the following formula (31) represents a change amount ΔXc in the position and posture of the hand 10 moved by the first operation (the first term of the formula (29)).

$$\Delta X_c = \lambda J_{is}^{\#}(s_{sg} - s_s) \quad (31)$$

A change amount ΔSlc of the image feature Sl of the long lead wire 30 assumed not to be inserted into the first hole 60 is estimated from the following formula (32). Here, the change amount ΔSlc is a change amount when the position and posture of the hand are changed by the change amount ΔXc.

$$\Delta s_{lc} = J_{il} \Delta X_c \quad (32)$$

The evaluation function q(X) is defined by the following formula (33) using the estimated change amount ΔSlc. ΔSlci is an i-th element of the ΔSlc.

$$q(X) = -\sum_{i=1}^{5} \Delta s_{lci}^2 \quad (33)$$

When the evaluation function q(X) is substituted into the formula (19), the ξ is obtained as represented by the following formula (34).

$$\xi = 2J_{il}^T \Delta s_{lc} \quad (34)$$
$$= 2J_{il}^T J_{il} \Delta X_c$$

When the ξ is used, the second term of the formula (29) acts to minimize (maximize the evaluation function q(X)) a sum of squares of elements of the change amount ΔSlc. That is, a control is performed not to cause an imaginary movement of the long lead wire 30 in association with the movement of the short lead wire 40 from when the second visual servoing is started. The redundant degree of freedom contained in the first term of the formula (29) is used for this control.

When the short lead wire 40 is moved without a control of the redundant degree of freedom, it is not possible to determine the disposition angle of the long lead wire 30 in the rotation direction about the axis of the short lead wire 40. Since the long lead wire 30 is bound by the first hole 60, when the capacitor 20 is rotated in the direction in which the long lead wire 30 is kept away from the first hole 60, the long lead wire 30 is considerably deformed, and a subsequent insertion operation is adversely affected. When the evaluation function of the formula (33) is used, it is possible to positively prevent a large movement of the hand 10, and the deformation of the long lead wire 30 as much as possible, using the second term of the formula (29).

7. Operation Information Input Method

The operations with different priorities are determined based on instruction of operation information. For example, the control device 100 includes the display control unit and a second reception unit, the display control unit displays an input screen on the display unit, the user inputs operation information to the input screen via the operation unit, and the second reception unit receives the operation information. Alternatively, the control device 100 may include the storage unit and the second reception unit, the storage unit may store operation information, and the second reception unit may receive the operation information read from the storage unit.

FIG. 12 illustrates a first example of the display screen for the input of the first operation information and the second operation information with a low priority than that of the first operation information. For example, the display control unit 140 is displayed on the display screen of the display unit 130 of the robot illustrated in FIGS. 16A and 16B.

A region IM1 and a region IM2 are set on the display screen. Here, the region IM1 is a region for the input of the high-priority first operation information, and the region IM2 is a region for the input of the low-priority second operation information. The regions IM1 and IM2 display an image OB1 of the capacitor (the first workpiece) and an image OB2 of the electronic substrate (the second workpiece).

In the region IM1, the user affixes a mark TP1 to the tip of the long lead wire on the image OB1 of the capacitor, and a mark GP1 to the hole for the insertion of the long lead wire on the image OB2 of the electronic substrate. Accordingly, a control portion (the first portion) and a target point (the first target) of a high-priority task are designated as the first operation information.

In the region IM2, the user affixes a mark TP2 to the tip of the short lead wire on the image OB1 of the capacitor, and a mark GP2 to the hole for the insertion of the short lead wire on the image OB2 of the electronic substrate. For example, when the high-priority task is accomplished, the image OB1' of the capacitor is displayed, and the mark GP2 is affixed to the tip of the short lead wire on the image OB1'. Accordingly, a control portion (the second portion) and a target point (the second target) of a low-priority task are designated as the second operation information.

Since the display screen displays the workpiece as an image, and feater points or target points are indicated on the image, it is possible to provide a user interface which is visually easy to comprehend. The reception unit 110 receives the designation information input via the display screen as the first operation information and the second operation information, and the process unit 120 can control the robot 300 based on the information. That is, the process unit 120 can select the image feature Sl and the target image feature Slg with respect to the first operation, and can select the image feature Ss and the target image feature Sg with respect to the second operation. It is possible to instruct the robot to execute the first and second operations with different priorities via visual servoing using the features.

FIG. 13 illustrates a second example of the display screen for the input of the first operation information and the second operation information with a low priority than that of the first operation information.

The display screen displays a first selection item OP1 for the input of the high-priority first operation information and a second selection item OP2 for the input of the low-priority second operation information. The selection item OP1 further includes a selection item OPA for the selection of a control object and a selection item. OPB for the selection of a control target of the control object.

The portions (the short lead wire and the long lead wires) of the capacitor (the first workpiece) can be selected via the selection item OPA. The holes (the first hole, the second hole, etc) of the electronic substrate (the second workpiece) can be selected via the selection item OPB. The user selects a desired control object (the first portion) and a desired control target (the first target) as the first operation information among the portions and holes.

It is possible to select how to control (the second target) a control object (the second portion) via the selection item OP2. For example, the posture of the end effector is taken as a control object, and an operation is executed without the posture being changed as much as possible. Alternatively, a lead wire (the long lead wire in FIG. 13) opposite to the control object selected via the selection item OPA is taken as a control object, and an operation is executed without the lead wire being imaginarily moved as much as possible. The user selects a desired operation as the second operation information among these operations.

On the display screen illustrated in FIG. 13, the operation is displayed as the selection, and thus it is possible to instruct operations such as the posture of the hand or an imaginary movement of the lead wire which cannot be displayed by only the feater points or target points. For example, this instruction method is appropriate for the second visual servoing described in step S5 of FIG. 2. The reception unit 110 receives selection information input via the display screen as the first operation information and the second operation information, and the process unit 120 can control the robot 300 based on the information. That is, the process unit 120 can select the image feature Ss and the target image feature Ssg with respect to the first operation, and can select the posture R (or ΔSlc) and the target posture Rg (or ΔSlc=0) with respect to the second operation. It is possible to instruct the robot to execute the first and second operations with different priorities via visual servoing using the features.

In the operation described above, the capacitor is assembled to the electronic substrate, but the embodiment is also applicable to other operations. That is, the first and second operations with different priorities can include a certain operation, and for example, the certain operation includes anyone of an assembly operation, a fitting operation, an insertion operation, and the like.

For example, in the fitting operation, a convex portion (a protrusion) of a first part is fitted into a concave portion (a hole) of a second part. When the convex portion is non-symmetrical, and is fitted into the concave portion in a specific direction, the first operation is an operation of moving the convex portion to a position directly above the concave portion, and the second operation is an operation of orienting the convex portion toward the concave portion in a fitting direction. For example, the assembly operation can assumably be an operation of rotating a screw with a driver. At this time, the first operation is an operation of moving the driver to a position directly above the screw, and the second operation is an operation of aligning the orientation of the driver in a rotational direction about a shaft of the driver with an orientation in which the tip of the driver is fitted into a head portion of the screw.

8. Second Control Process Flow

FIG. 14 illustrates a second flowchart of the control process in which the process unit 120 operates the robot 300. This process flow is different from the process flow described with reference to FIG. 2, and does not include the position control between the visual servoing.

Specifically, first, the hand 10 holds the main body portion 25 (step S21). Subsequently, the first position control causes the capacitor 20 to move to a starting point of the visual servoing (step S22).

Subsequently, the first operation is executed so as to align the feater point TPa of the long lead wire 30 with the target point GPa using the first visual servoing (step S23). Similar to step S3 of FIG. 2, the process may include a low-priority operation of bring the tip of the short lead wire 40 close to the target point.

Subsequently, the second operation is executed so as to align the feater point TPc of the short lead wire 40 with the target point GPc using the second visual servoing (step S24). At this time, as the feater point TPc of the short lead wire 40 is brought close to the target point GPc, the long lead wire 30 is inserted into the first hole 60. When the long lead wire 30 or the short lead wire 40 is bent, the long lead wire 30 is deformed. Similar to step S5 of FIG. 2, the process may include a low-priority operations such as an operation in which the posture of the hand 10 is not changed as much as possible, or an operation of minimizing an estimated change amount of the image feature of the long lead wire 30.

Subsequently, the second position control causes the capacitor 20 to move downward (an insertion direction), and the short lead wire 40 to be inserted into the second hole 70 (step S25).

As described in step S4 of FIG. 2, the process unit 120 operates the robot 300 using the visual servoing, and thus it is possible to accurately bring the tip of the lead wire close to the hole. Since the movement direction is determined in the insertion operation of the short lead wire 40 into the second hole 70, the process unit 120 can operate the robot 300 using the position control, and an operation time period can be shortened compared to when the visual servoing is used.

When the short lead wire 40 of the lead wires with different lengths is brought close to the second hole 70 using the virtual servoing, the long lead wire 30 can be naturally inserted into the first hole 60. For this reason, in the second visual servoing, it is possible to simultaneously execute the insertion operation of the long lead wire 30, and it is possible to reduce the number of steps of the operation.

9. Third Control Process Flow

FIG. 15 illustrates a third flowchart of the control process in which the process unit 120 operates the robot 300. In this process flow, an assembly operation of the resistor element 80 with two lead wires of the same length (or substantially the same length) is described.

As illustrated in FIG. 15, the resistor element 80 includes the main body portion 85 that generates electrical resistance; the first lead wire 35 (the first portion) that is a first terminal of the resistor element 80; and the second lead wire 45 (the second portion) that is a second terminal of the resistor element 80. The electronic substrate 50 is provided with the third hole 65 (the first hole portion) and the fourth hole 75 (the second hole portion). The first lead wire 35 and the second lead wire 45 are respectively inserted into the third hole 65 and the fourth hole 75, and are mounted into the third hole 65 and the fourth hole 75 via soldering or the like, and thus the resistor element 80 and the electronic substrate 50 are assembled together.

When the control process is started, first, the hand 10 holds the main body portion 85 (step S41). Subsequently, the first position control causes the resistor element 80 to move to a starting point of visual servoing (step S42).

Subsequently, the first and second operations are executed using the visual servoing (step S43). Here, the first operation is an operation of aligning a feater point TPd of the first lead wire 35 with a target point GPd, and the second operation is an operation of aligning a feater point TPe of the second lead wire 45 with a target point GPe. This visual servoing may use the above-mentioned basic process (the first control method of the visual servoing).

Subsequently, the second position control causes the resistor element 80 to move downward (an insertion direction), the first lead wire 35 to be inserted into the third hole 65 and the second lead wire 45 to be inserted into the fourth hole 75 (step S44).

As described in step S4 of FIG. 2, the process unit 120 operates the robot 300 using the visual servoing, and thus it is possible to accurately bring the tip of the lead wire close to the hole. Since the movement direction is determined in the insertion operation of the short lead wire 40 into the second hole 70, the process unit 120 can operate the robot 300 using the position control, and an operation time period can be shortened compared to when the visual servoing is used.

When the two lead wires of the same length are respectively aligned with the holes, the two lead wires are not inclined with respect to the electronic substrate 50. For this reason, it is possible to simultaneously align the two lead wires with the holes using one time of visual servoing, respectively, and it is possible to respectively insert the two lead wires into the holes in a subsequent step. Since the visual servoing, in which a feedback control is performed via an image, is complete at one time, an operation time period is shortened.

10. Robot

Figure 16A:
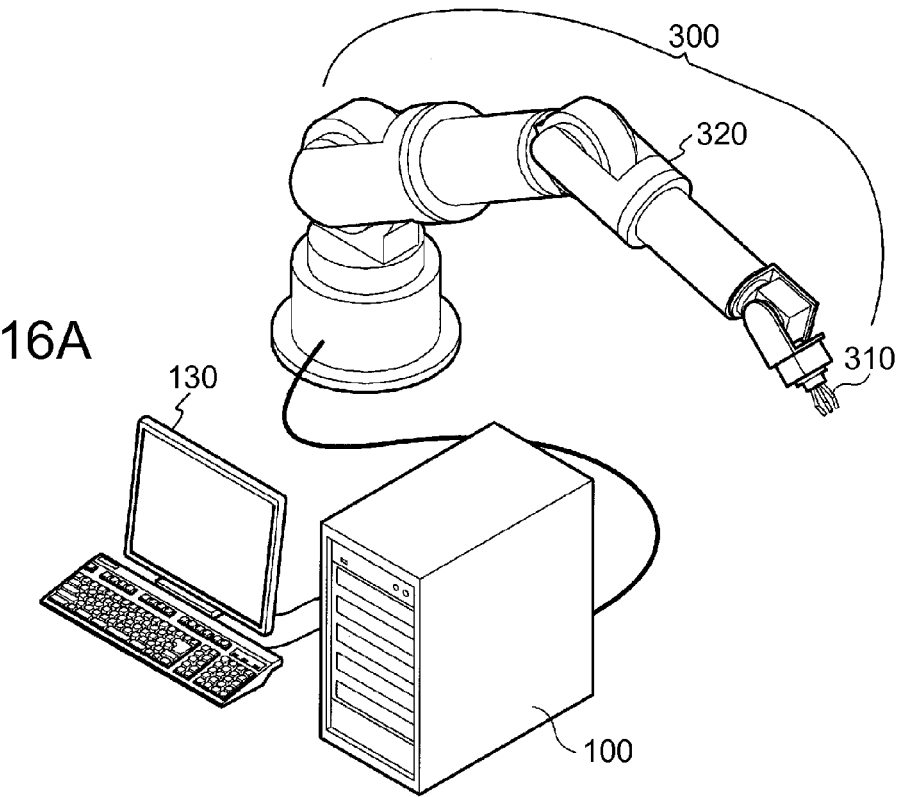
FIGS. 16A and 16B are configuration examples of a robot.
Figure 16B:
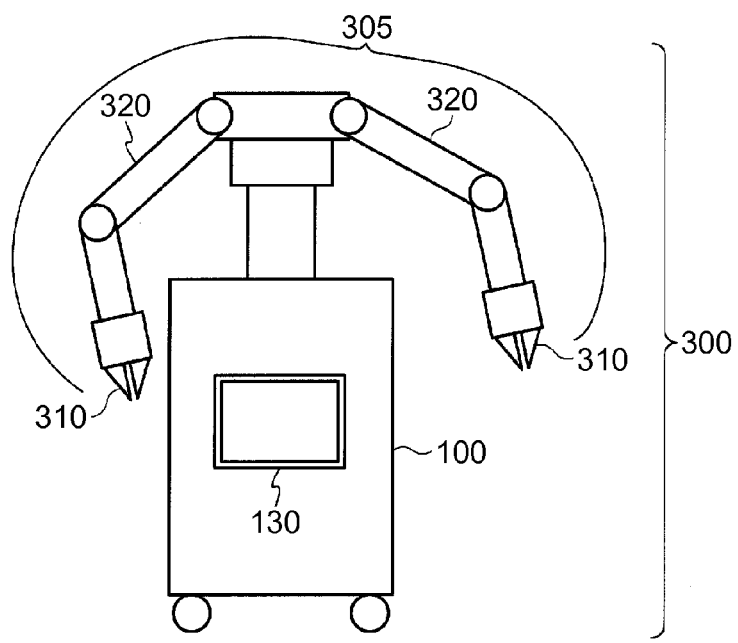

Subsequently, FIGS. 16A and 16B illustrate a configuration example of the robot 300 to which the control device 100 (a robot control system) of the embodiment is applied. In each of FIGS. 16A and 16B, the robot 300 has the arm 320 and an end effector 310.

The end effector 310 is a component that is attached to an endpoint of the arm 320 so as to hold, lift, hoist, suction, or machine a workpiece (an operation target object). For example, the end effector 310 may be a hand (a holding portion), a hook, a suction pad, or the like. A plurality of the end effectors may be provided in one arm 320. The arm 320 is a part of the robot 300, and a movable part including one or more joints.

For example, the robot 300 illustrated in FIG. 16A is configured separately from the control device 100. At this time, for example, a partial function or the entire functions of the control device 100 are realized by a personal computer (PC). A robot system refers to a system including the robot 300 and elements (the control device 100, the imaging unit 200 illustrated in FIGS. 1A and 1B and the like) that are configured separately from the robot 300.

The robot of the embodiment is not limited to the configuration illustrated in FIG. 16A, and a robot main body 305 and the control device 100 may be integrated together as illustrated in FIG. 16B. That is, the robot 300 may include the control device 100.

Specifically, as illustrated in FIG. 16B, the robot 300 has the robot main body 305 and a base unit that supports the robot main body, and the control device 100 may be stored in the base unit. The robot main body 305 has the arm 320 and the end effector 310. In FIG. 16B, the base unit of the robot 300 is provided with wheels and the like, and the entirety of the robot 300 is movable.

The control device 100 in FIGS. 16A and 16B is provided with the display unit 130. The display screen described with reference to FIGS. 12 and 13 is displayed on the display unit 130 by the control device 100. In FIG. 16A, the display unit 130 is a display device of the PC. In FIG. 16B, the base unit is provided with the display unit 130. Alternatively, the display unit 130 may be configured in such a manner that the display unit 130 is connectable to the base unit from the outside.

FIG. 16A illustrates the robot with a single arm, and as illustrated in FIG. 16B, the robot 300 may be a robot with multiple arms such as double arms. The user may move the robot 300 with the hands, or the robot 300 may be provided with a motor for the drive of the wheels, and the robot 300 may move via a control of the motor by the control device 100. As illustrated in FIG. 16B, the installation position of the control device 100 is not limited to the base unit provided below the robot 300.

As illustrated in FIG. 17, the functions of the control device 100 may be realized by a server 500 that is communicatively connected to the robot 300 via a network 400 including at least one of wire communication and wireless communication.

Alternatively, in the embodiment, a part of processes of the control device according to the invention may be executed by a control device of the server 500. At this time, the processes are distributed and realized between the control device provided in the robot 300 and the control device of the server 500. For example, the control device of the robot 300 is a terminal device (a control unit) 330 installed in the robot 300.

At this time, the control device of the server 500 executes processes assigned thereto among the processes of the control device according to the invention. In contrast, the control device provided in the robot 300 executes processes assigned thereto among the processes of the control device according to the invention. The processes of the control device according to the invention may be the processes assigned to the server 500, and may be the process assigned to the robot 300.

Accordingly, for example, the server 500 having processing capacity higher than that of the terminal device 330 can execute processes of high throughput rates. For example, the server 500 can integrally control the operations of the robots 300, and it is easy to execute coordinated operations of a plurality of the robots 300.

In recent years, small volumes of production in great varieties are increasing. It is necessary to change operations to be executed by the robot, when changing the type of a component to be manufactured. In the configuration illustrated in FIG. 17, even though the plurality of robots 300 are not taught about operations to be executed, the server 500 can integrally change the operations to be executed by the robots 300.

In the configuration illustrated in FIG. 17, it is possible to considerably reduce labor hours for updating software of the control device 100 compared to when the control devices 100 are respectively provided in the robots 300.

11. Characteristics-based Visual Servoing

Here, the outline of visual servoing and a process flow of characteristics-based visual servoing will be described.

The visual servoing is a type of servo system by which a change in the position of a target object is measured as visual information, and the target object is traced by using the visual information as feedback information. The visual servoing is mainly divided into two visual servoing such as position-based visual servoing and characteristics-based visual servoing, depending on input information (control amount) into respective servo systems. In the position-based visual servoing, position information or posture information of an object becomes input information into the servo system, and in the characteristics-based visual servoing, a feature of an image becomes input information into the servo system. In addition, there is also a hybrid of combining the position-based visual servoing and the characteristics-based visual servoing. The position-based visual servoing and the characteristics-based visual servoing are in common in that input information into the servo system is obtained from reference images and captured images. The visual servoing adopted in the invention is the characteristics-based visual servoing.

Figure 18:
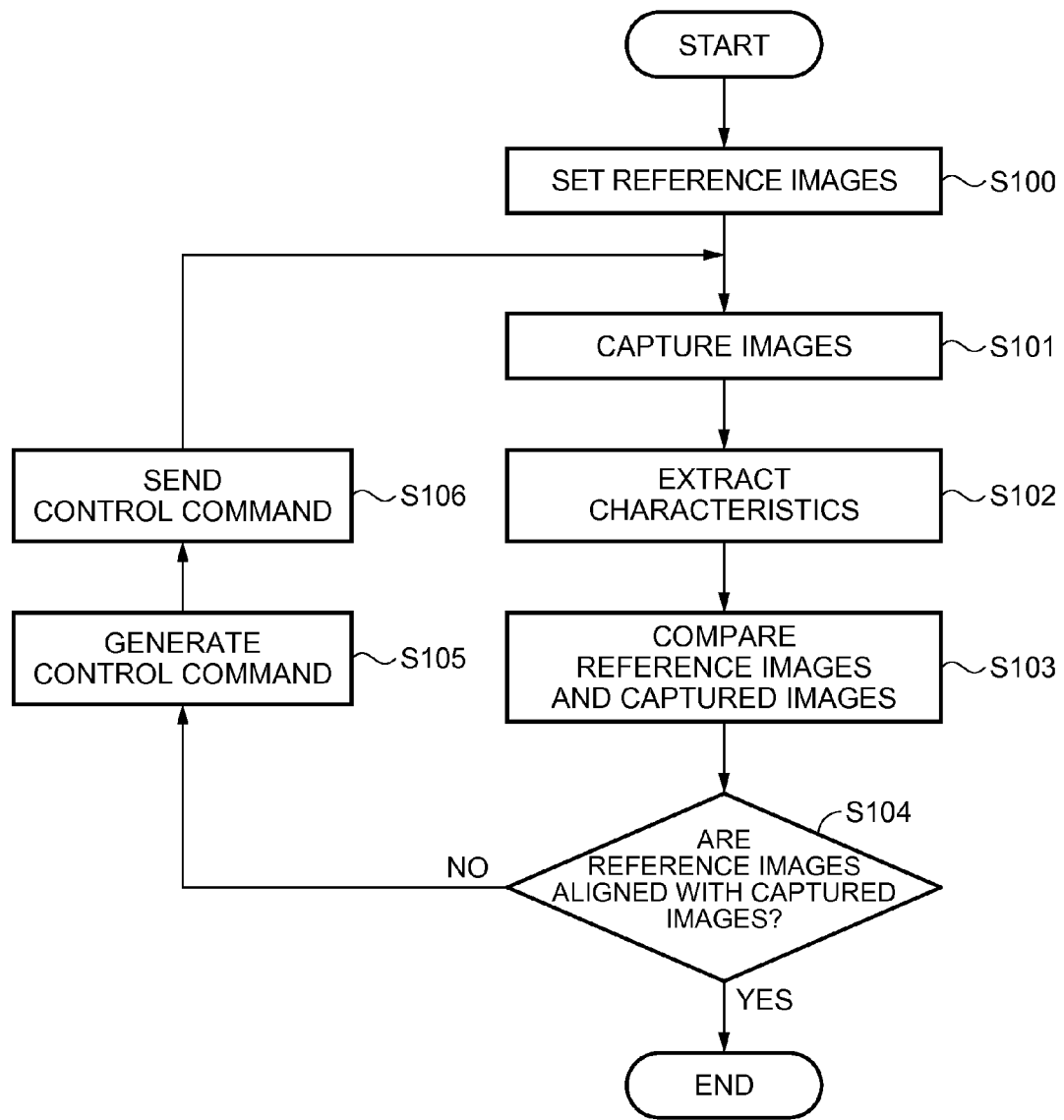
FIG. 18 is a flowchart of characteristics-based visual servoing.

FIG. 18 illustrates a flowchart of the characteristics-based visual servoing. This process flow is executed by the process unit 120. First, reference images are set (step S100). Here, the reference images are also referred to as target images or goal images, are a control target of the visual servoing, and represent a target state of the robot 300. That is, the reference images represent a target position or a target posture of the robot 300, or represent a state in which the robot 300 is present at the target position.

Subsequently, the imaging unit 200 captures the image of an operation space, and acquires the captured images (step S101). The captured images represent a current state of the operation space, and when the robot 300 or a workpiece is reflected on the captured images, the captured images represent a current state of the robot 300 or the workpiece. A process delay may occur due to the performance of the imaging unit 200. However, here, even though a process delay occurs, the current state is reflected on the captured images.

When the characteristics-based visual servoing is used, it is desired that the characteristics of the reference images be extracted and features be calculated when the reference images are set. Alternatively, the storage unit may store reference image information including the extracted characteristics of the reference images.

Subsequently, the characteristics of the captured images are extracted (step S102). It is desired that the characteristics of the reference images be extracted when the reference images are set, but the characteristics of the reference images may be extracted in step S102. The features of the images are obtained as input information into the visual servo system while the characteristics are extracted.

The reference images and the captured images are compared to each other to determine the alignment thereof based on the features of the images (step S103). When it is determined that the images are aligned with each other (step S104), the visual servoing is complete. In contrast, when it is determined that the images are not aligned with each other (step S104), the process unit 120 generates a control command (step S105), and sends the control command to the robot 300 (step S106).

Here, the control command (control signal) refer to a command (a signal) including information for controlling the robot 300. For example, a velocity command is an example of the control command. The velocity command is information for controlling each portion of the robot 300, and indicates a command of defining moving velocities or rotational velocities of the end point and the like of the arm of the robot 300.

In the characteristics-based visual servoing, the above-mentioned processes are repeated until a control amount converges to a target value. That is, the control command in step S106 changes the posture of the robot 300, and in step S101, the image of the posture is captured. The process unit 120 controls the robot 300 from the first posture that is a posture when the visual servoing is started to the second posture that is a posture when the visual servoing is complete, based on a plurality of the images captured while changing the posture in this manner.

In the embodiment, a program may cause a part or the majority of processes of the control device, the robot, and the like to be realized. At this time, the execution of the program by a processor such as the CPU realizes the control device, the robot, and the like of the embodiment. Specifically, the program stored in a information storage medium is read, and the processor such as the CPU executes the program that is read. Here, the information storage medium (a medium readable by a computer) stores the program, data, and the like, and the functions of the information storage medium can be realized in a form of an optical disc (DVD, CD, or the like), a hard disc drive (HDD), or a memory (a card type memory, a ROM, or the like). The processor such as the CPU executes various processes of the embodiment based on the program (the data) stored in the information storage medium.

That is, the information storage medium stores the program (the program to cause the computer to execute processes of each portion) that causes the computer (a device provided with an operation unit, a process unit, a storage unit, an output unit) as a portion of the embodiment to function.

The embodiment is described in detail, but persons in the related art can understand that various modifications can be made insofar as the modifications do not practically depart from new items and the effects of the invention.

Accordingly, the modification examples are included in the range of the invention. For example, when terms are used at least once in the specification or the drawings along with other terms with a broader meaning or the same meaning, the terms can be replaced with the other terms at any location of the specification or the drawings. The combination of the embodiment and the entirety of the modification examples is included in the range of the invention. The configurations and operations of the process unit, the reception unit, the control device, and the robot, the control method of the visual servoing, the control method of the robot, and the like are not limited to those in the embodiment, and various modification can be made to the embodiment.

The entire disclosures of Japanese Patent Application Nos. 2013-227274, filed Oct. 31, 2013 and 2013-227275, filed Oct. 31, 2013 are expressly incorporated by reference herein.

What is claimed is:

1. A control device comprising:
a camera that captures a plurality of images of a target object, the images being captured multiple times while an end effector of a robot having the target object moves from a first posture to a second posture different from the first posture, the plurality of images including a first image of a first part of the target object and a second image of a second part of the target object, the second part being different than the first part; and
a controller that is configured to:
receive first operation information and second operation information different from the first operation information;
calculate first and second features based on the first and second images at first and second positions of the target object, respectively; and
have a first target feature that corresponds to a first ideal image of the first part of the target object at the first position and have a second target feature that corresponds to a second ideal image of the second part of the target object at the second position,
wherein the first and second features and the first and second target features correspond to an area, a position, a length, or an inclination of the first and second parts of the target object,
the controller is configured to control the end effector by visual servoing so as to move the first part by making the first feature closer to the first target feature according to the first operation information, and
the controller is configured to control the end effector by the visual servoing so as to move the second part by making the second feature closer to the second target feature according to the second operation information.

2. The control device according to claim 1, wherein the first operation information is used to conform the first part of the target object at the first position to the first ideal image.

3. The control device according to claim 1, wherein the second feature includes an estimated change amount of the second part of the target object after the first part of the target object is moved by the end effector according to the first operation information, and
wherein the second target feature indicates that the estimated change amount becomes zero.

4. The control device according to claim 1, wherein the first operation information and the second operation information respectively include any one of an assembly operation, a fitting operation, and an insertion operation.

5. A robot comprising:
an end effector that grasps a target object;
a camera that captures a plurality of images of the target object, the images being captured multiple times while the end effector having the target object moves from a first posture to a second posture different from the first posture, the plurality of images including a first image of a first part of the target object and a second image of a second part of the target object, the second part being different than the first part;
a controller that is configured to:
receive first operation information and second operation information different from the first operation information;
calculate first and second features based on the first and second images at first and second positions of the target object, respectively; and
have a first target feature that corresponds to a first ideal image of the first part of the target object at the first position and have a second target feature that corresponds to a second ideal image of the second part of the target object at the second position,
wherein the first and second features and the first and second target features correspond to an area, a position, a length, or an inclination of the first and second parts of the target object,
the controller is configured to control the end effector by visual servoing so as to move the first part by making the first feature closer to the first target feature according to the first operation information, and
the controller is configured to control the end effector by the visual servoing so as to move the second part by making the second feature closer to the second target feature according to the second operation information.

6. A control method of a robot for causing a processor to execute a process, the method comprising executing on the processor the steps of:
receiving first operation information and second operation information different from the first operation information;
capturing a plurality of images of a target object by a camera, the images being captured multiple times while an end effector of the robot having the target object moves from a first posture to a second posture different from the first posture, the plurality of images including a first image of a first part of the target object and a second image of a second part of the target object, the second part being different than the first part;
calculating first and second features based on the first and second images at first and second positions of the target object, respectively; and
having a first target feature that corresponds to a first ideal image of the first part of the target object at the first position and have a second target feature that corresponds to a second ideal image of the second part of the target object at the second position,
wherein the first and second features and the first and second target features correspond to an area, a position, a length, or an inclination of the first and second parts of the target object,
the end effector is controlled by visual servoing so as to move the first part by making the first feature closer to the first target feature according to the first operation information, and
the end effector in controlled by the visual servoing so as to move the second part by making the second feature closer to the second target feature according to the second operation information.

* * * * *